$$\begin{bmatrix} b_1 \\ b_2 \\ \vdots \\ b_m \end{bmatrix} = \begin{bmatrix} d_1^1 & d_1^2 & \cdots & d_1^n \\ d_2^1 & & & \\ \vdots & & & \vdots \\ d_m^1 & & & d_m^n \end{bmatrix} \begin{bmatrix} a_1 \\ d_2 \\ \vdots \\ a_n \end{bmatrix}$$

OR $b_i = \sum_{j=1}^{n} d_i^j a_j = d_i^1 a_1 + d_i^2 a_2 + \cdots + d_i^n a_n$

WHERE $b_i \ (i = 1, 2, \cdots m)$ — SET OF $m$ BEAMS $a_j \ (j = 1, 2, \cdots n)$ — SET OF $n$ RECEIVERS $d_i^j$ — DELAYS Fig. 1 — BEAM EQUATIONS

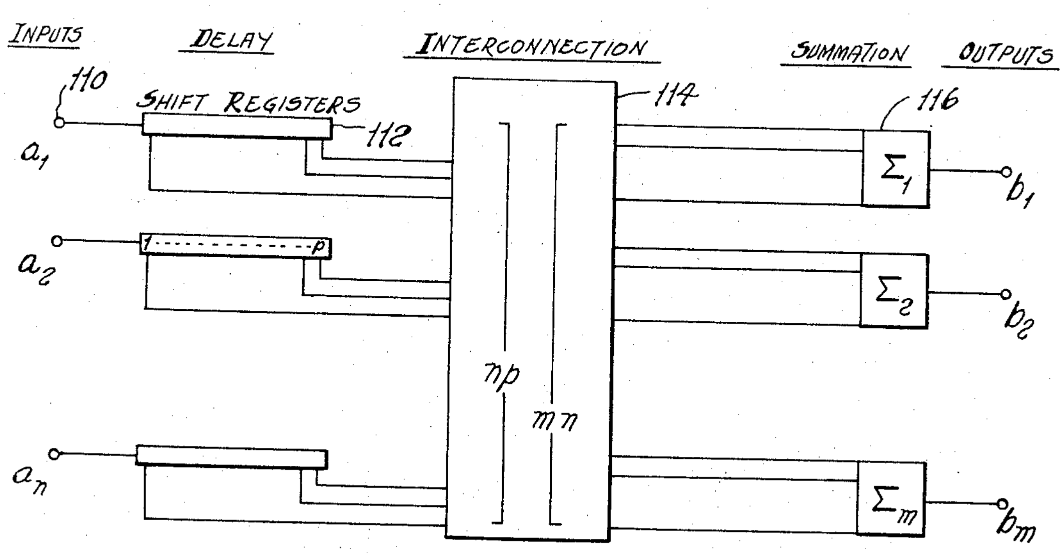

Fig. 2 — BEAMFORMING FUNCTIONS

INVENTOR.
LUC E. CROUSEL
BY Philip Schneider
Louis B. Applebaum
ATTORNEYS

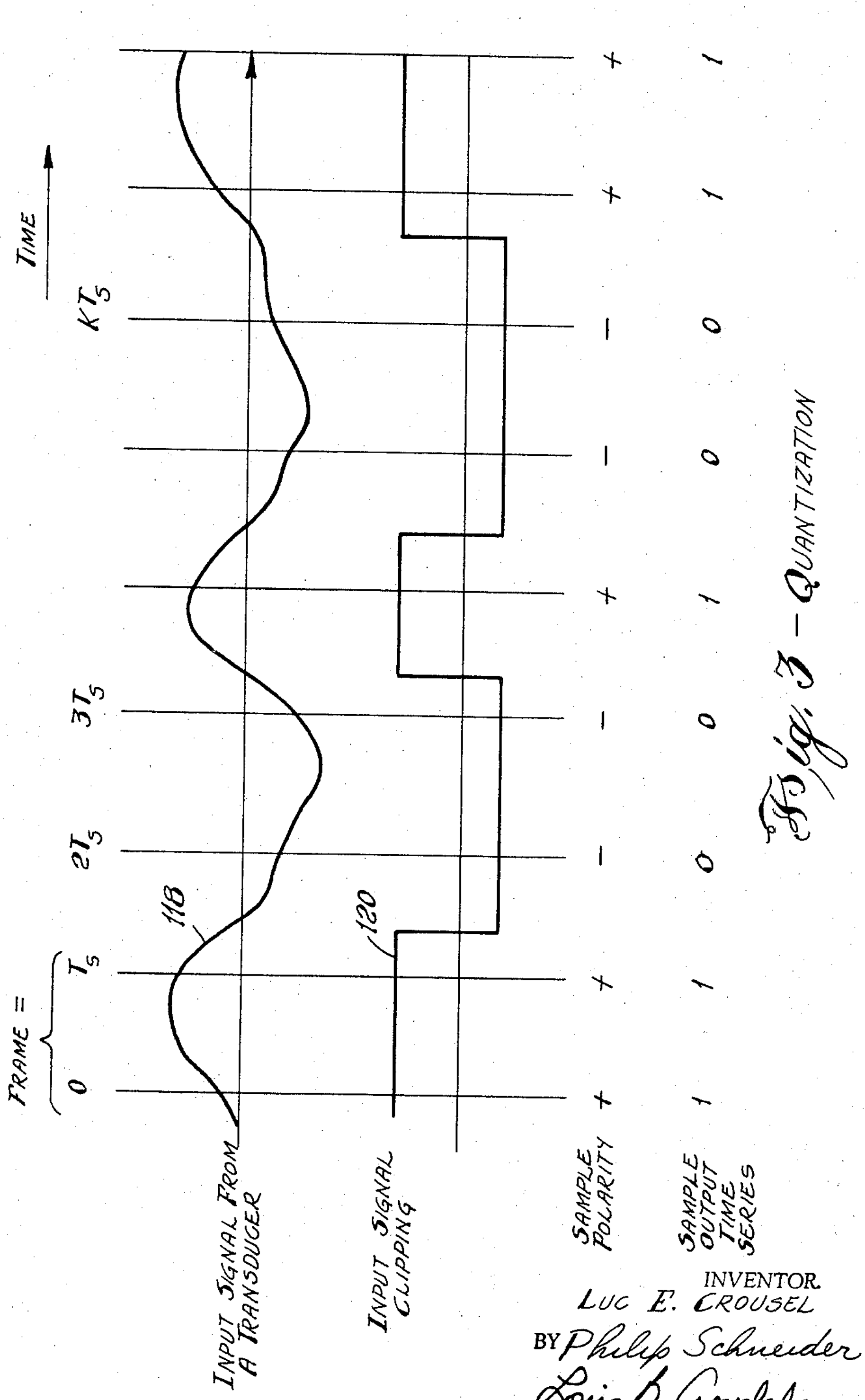
Fig. 3 - QUANTIZATION
INVENTOR.
LUC E. CROUSEL
BY Philip Schneider
Louis B. Applebaum
ATTORNEYS

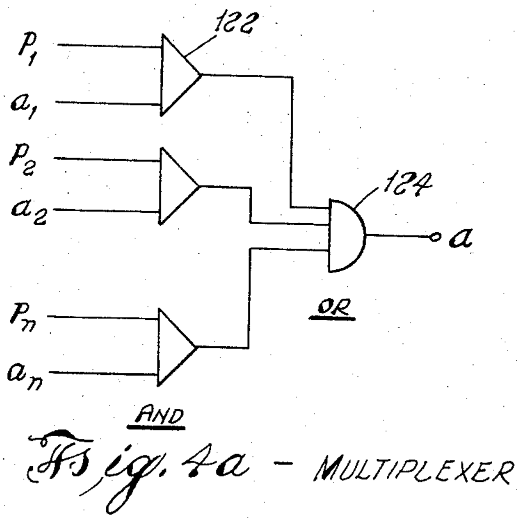
Fig. 4a – MULTIPLEXER
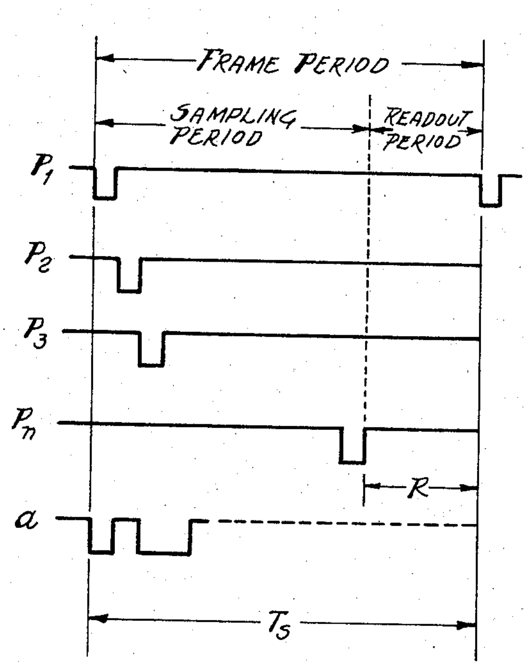
Fig. 4b – MULTIPLEXER WAVEFORMS
INVENTOR.
LUC E. CROUSEL
BY Philip Schneider
Louis B. Applebaum
ATTORNEYS

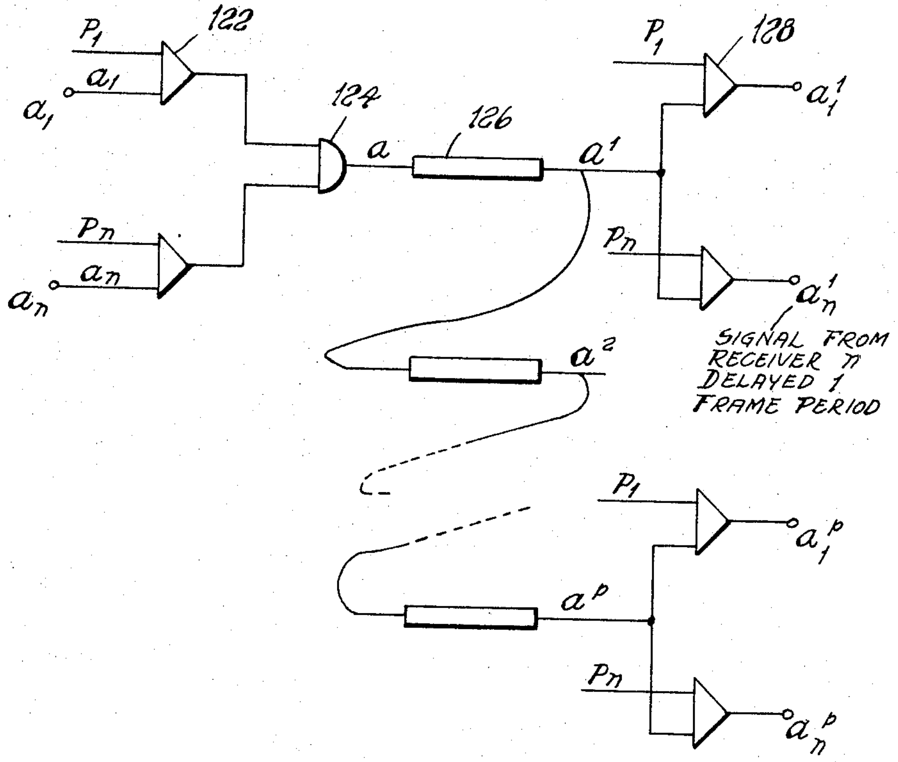
Fig. 5-MULTIPLEX DELAY
INVENTOR.
LUC E. CROUSEL
BY Philip Schneider
Louis B. Applebaum
ATTORNEYS CORE MEMORY MATRIX IN MULTIBEAM RECEIVING SYSTEM
Filed July 15, 1963 19 Sheets-Sheet 5
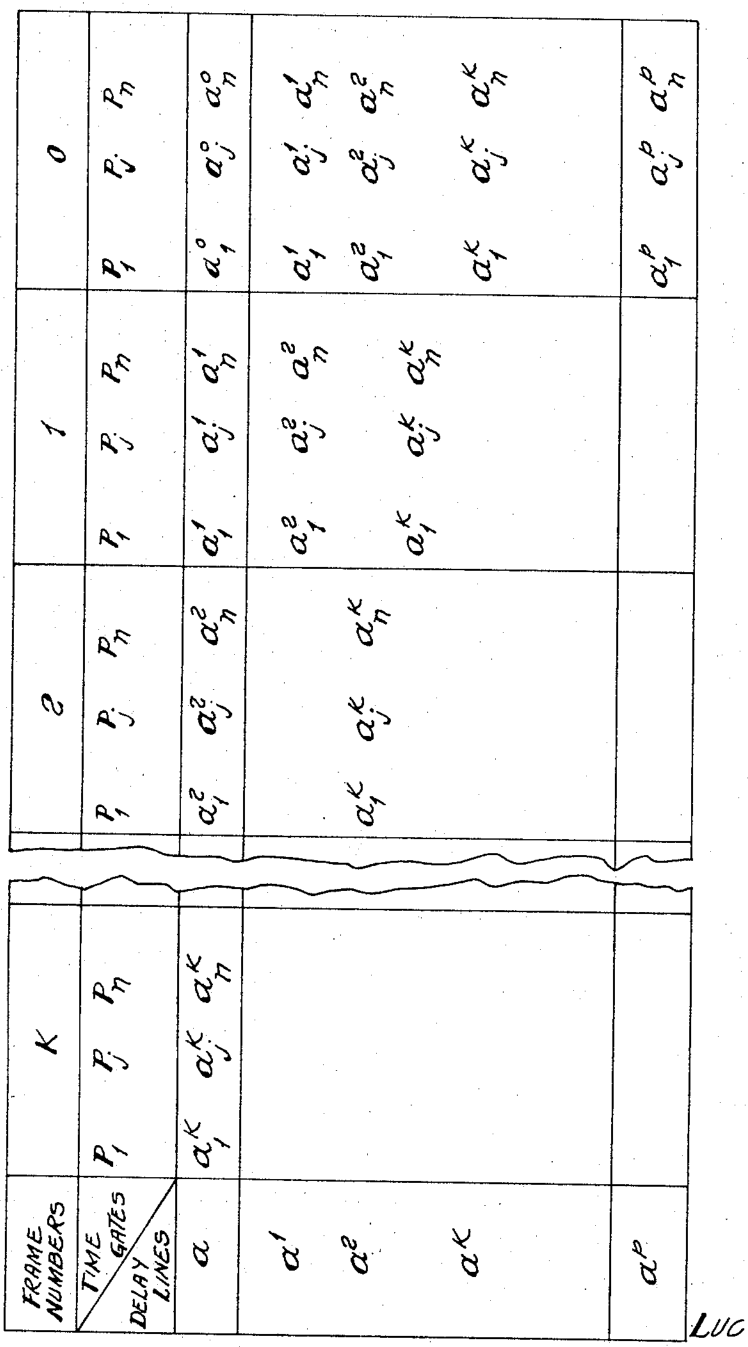
Fig. 6 - TIME DELAY CHART
INVENTOR.
LUC E. CROUSEL
BY Philip Schneider
Louis B. Applebaum
ATTORNEYS Feb. 6, 1968 L. E. CROUSEL 3,368,202
CORE MEMORY MATRIX IN MULTIBEAM RECEIVING SYSTEM
Filed July 15, 1963 19 Sheets-Sheet 6
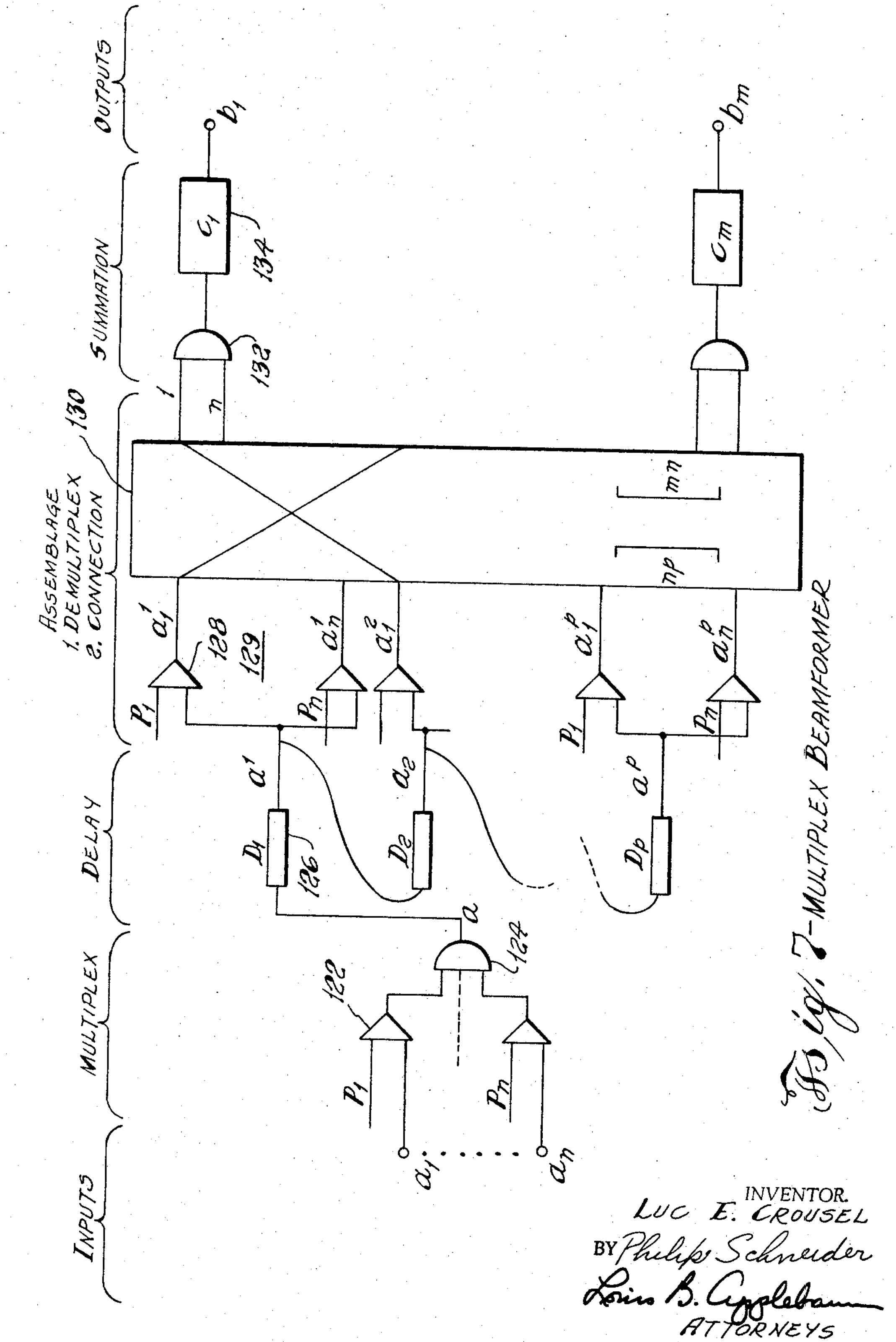
Fig. 7-MULTIPLEX BEAMFORMER
INVENTOR.
LUC E. CROUSEL
BY Philips Schneider
Louis B. Applebaum
ATTORNEYS CORE MEMORY MATRIX IN MULTIBEAM RECEIVING SYSTEM
Filed July 15, 1963 19 Sheets-Sheet 7
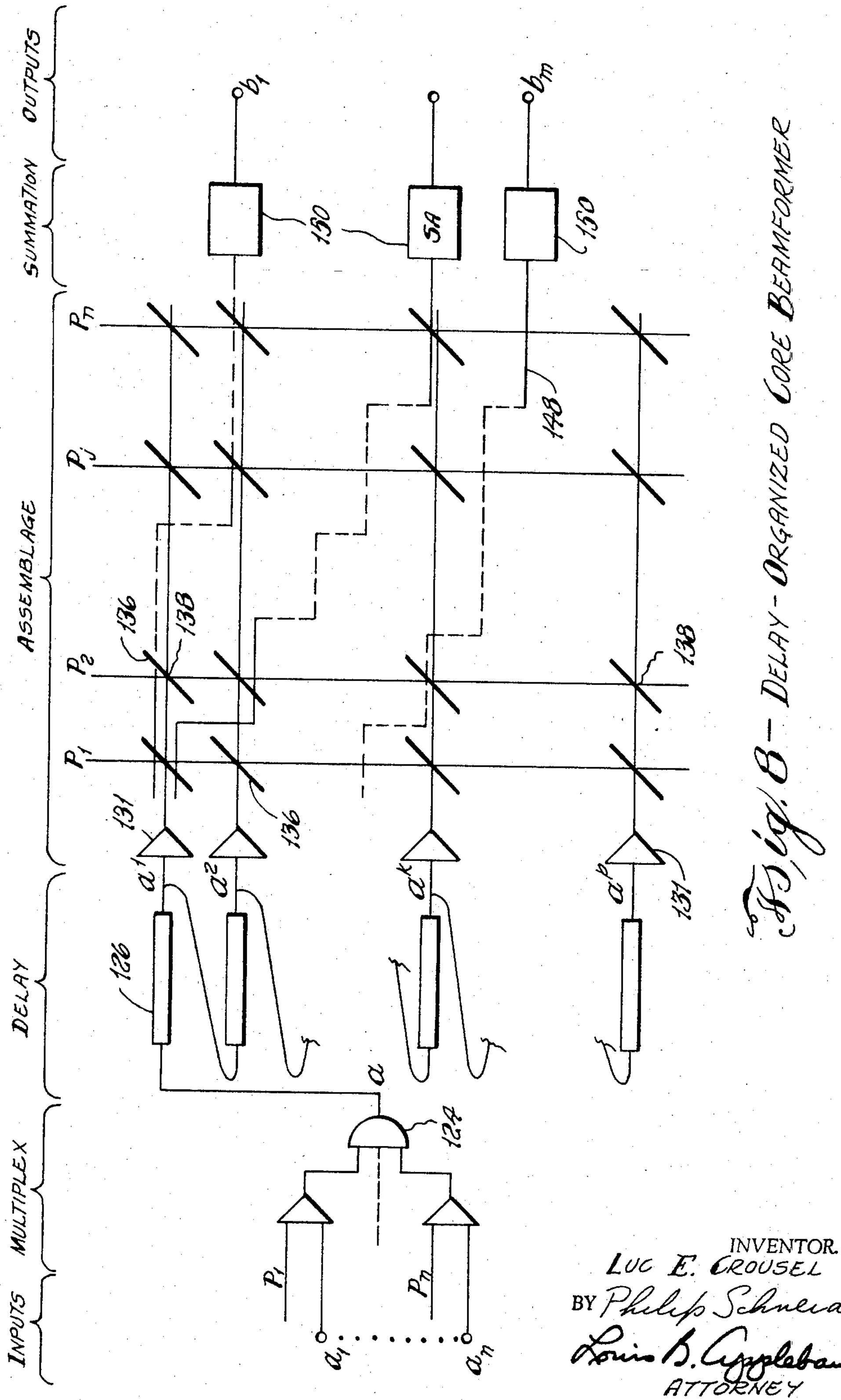
FIG. 8 - DELAY-ORGANIZED CORE BEAMFORMER
INVENTOR.
LUC E. CROUSEL
BY Philip Schneider
Louis B. Applebaum
ATTORNEY

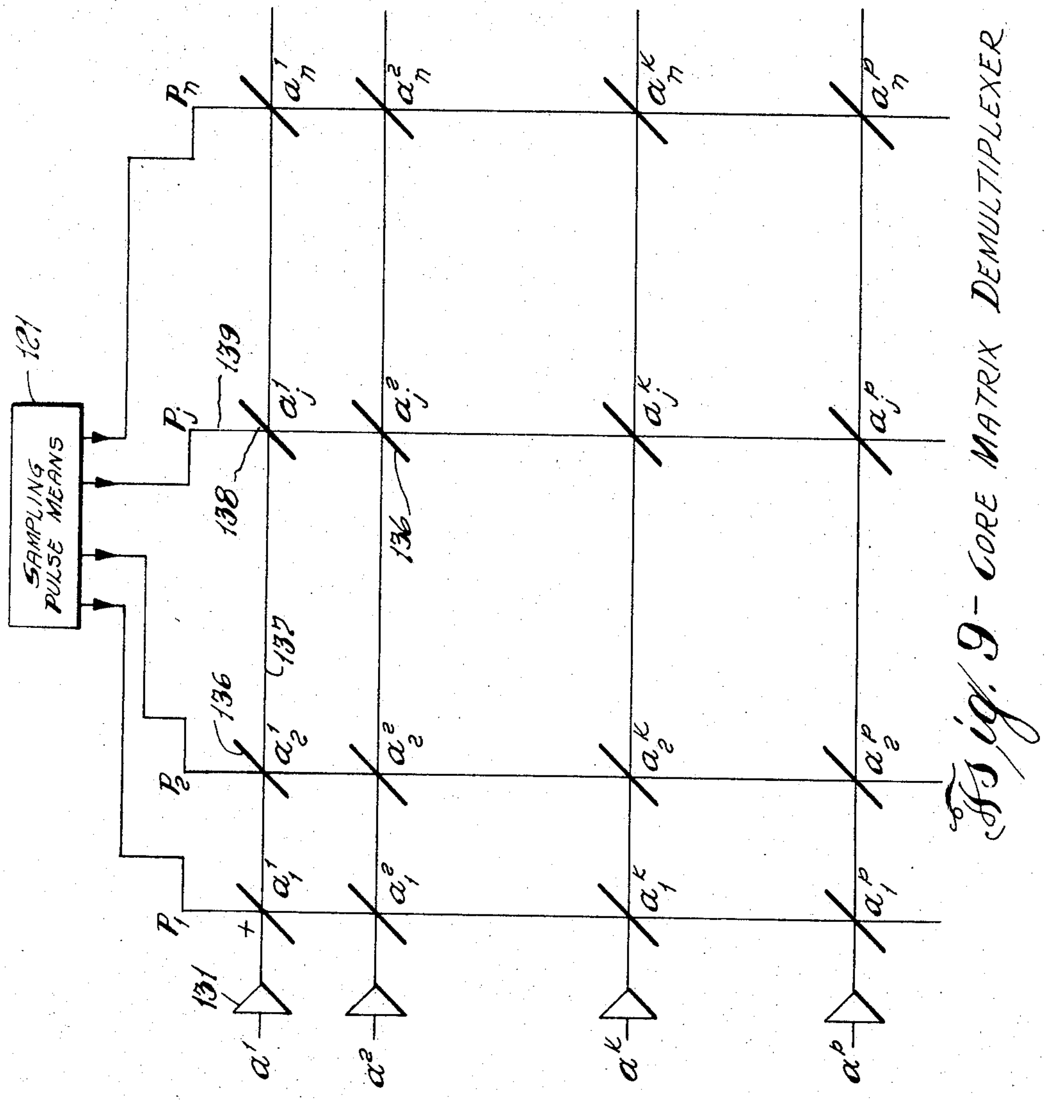
Fig. 9 - CORE MATRIX DEMULTIPLEXER
INVENTOR.
LUC E. CROUSEL
BY Philip Schneider
Louis B. Applebaum
ATTORNEYS Fig. 11 — BEAM SENSE WIRE

CORE HYSTERESIS CURVE

CORE SWITCHING VOLTAGE

INVENTOR.
LUC E. CROUSEL
BY Philip Schneider
Louis B. Applebaum
ATTORNEYS

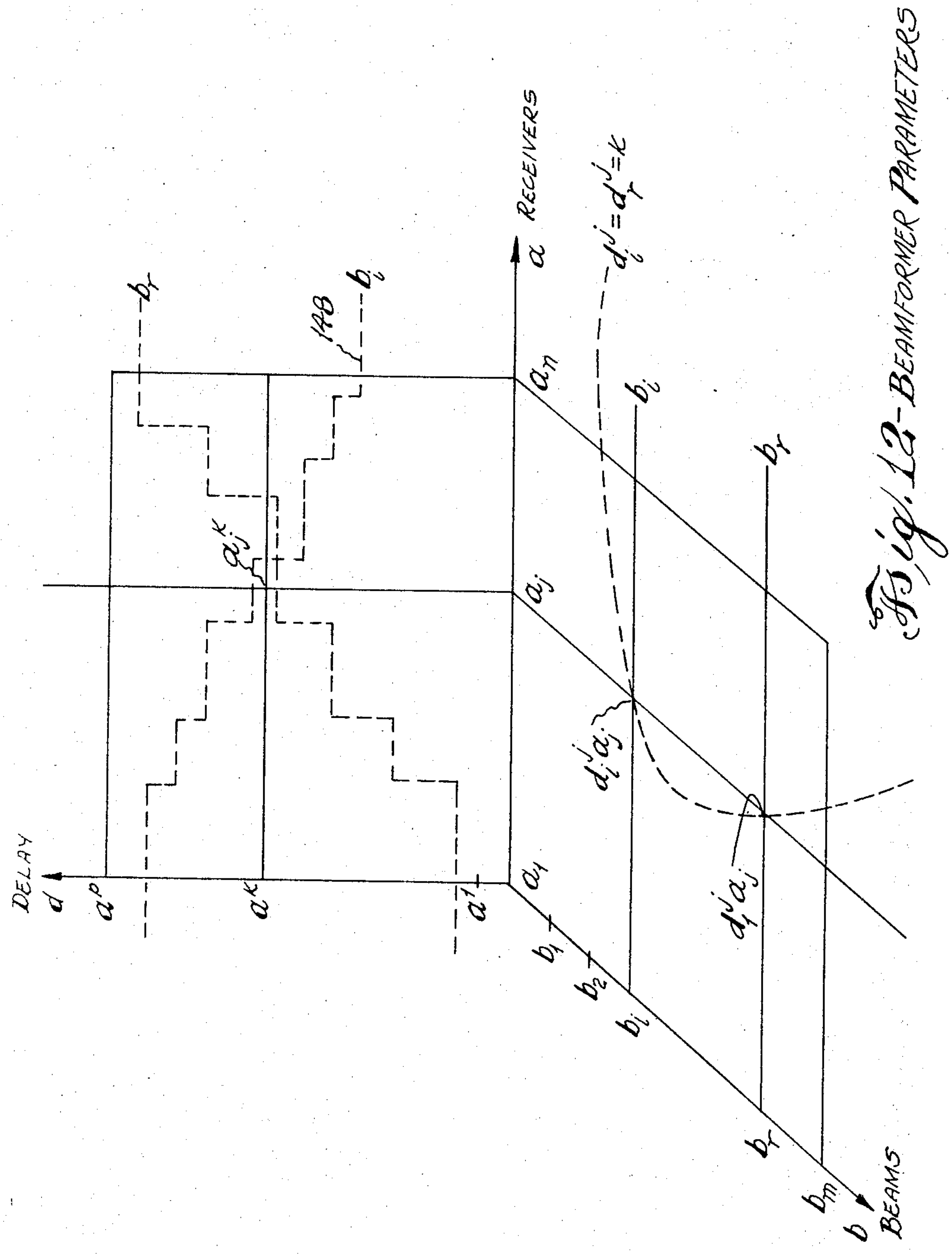
Fig. 12 - BEAMFORMER PARAMETERS
INVENTOR
LUC E. CROUSEL
BY Philip Schneider
Louis B. Applebaum
ATTORNEYS Feb. 6, 1968 L. E. CROUSEL 3,368,202
CORE MEMORY MATRIX IN MULTIBEAM RECEIVING SYSTEM
Filed July 15, 1963
19 Sheets-Sheet 11
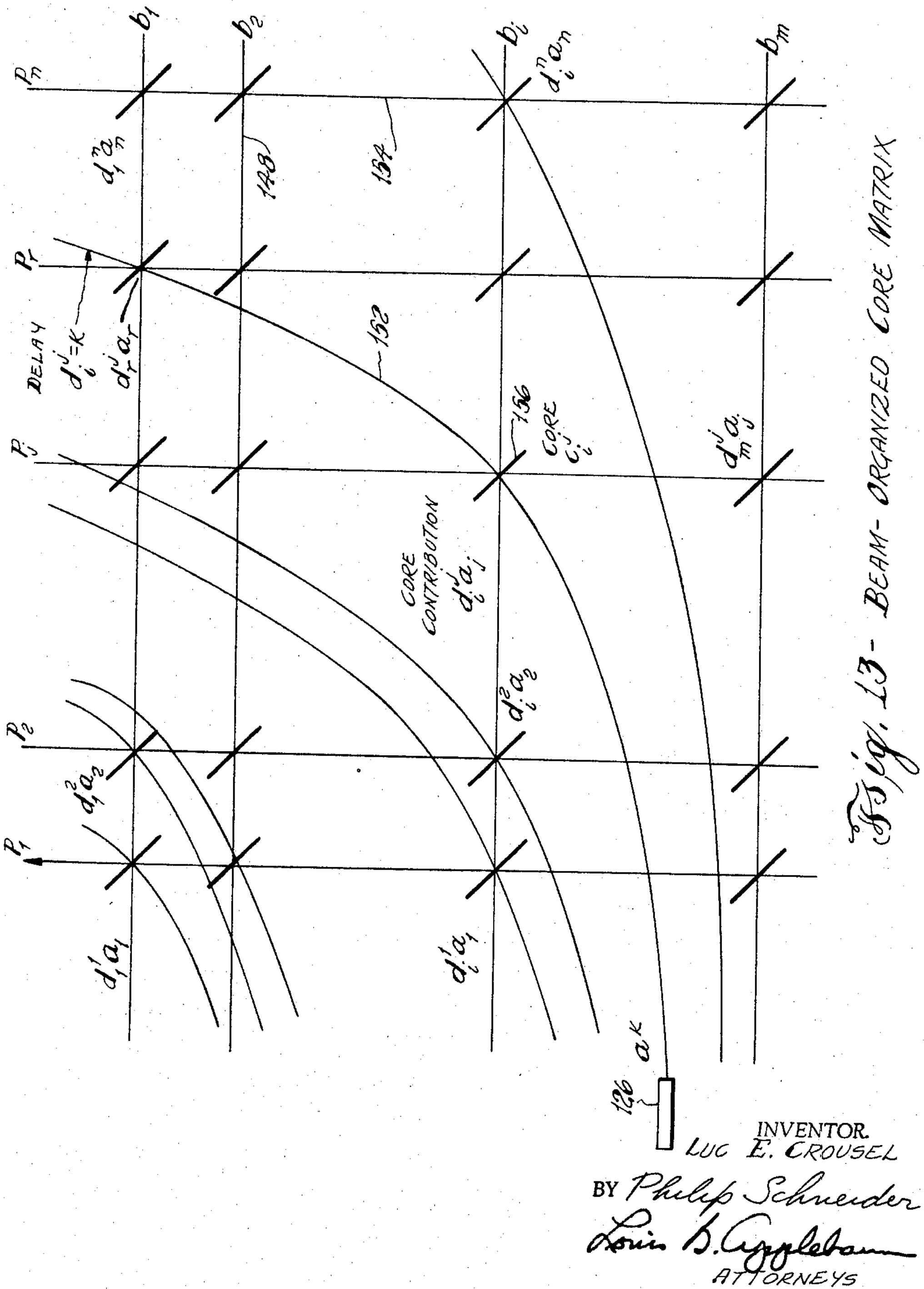
Fig. 13 - BEAM-ORGANIZED CORE MATRIX
INVENTOR.
LUC E. CROUSEL
BY Philip Schneider
Louis B. Applebaum
ATTORNEYS

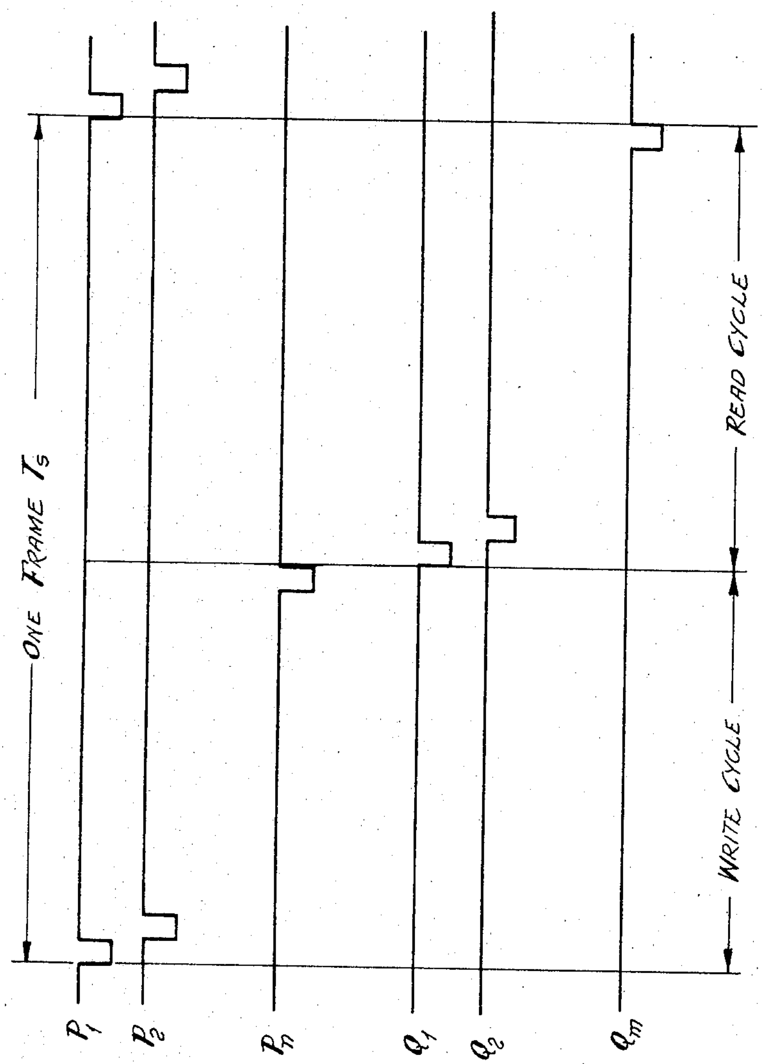
Fig. 12 - WRITE AND READ CYCLE TIMING
INVENTOR.
LUC E. CROUSEL
BY Philip Schneider
Louis B. Applebaum
ATTORNEYS

BEAM-ORGANIZED CORE BEAMFORMER

INVENTOR
LUC E. CROUSEL
BY Philip Schneider
Louis B. Applebaum
ATTORNEYS

Fig. 16 - CORE BEAMFORMER WITH MANY INPUTS

INVENTOR.
LUC E. CROUSEL
BY Philip Schneider
Louis B. Applebaum
ATTORNEYS

CORE BEAMFORMER WITH MANY INPUTS AND OUTPUTS

INVENTOR.
LUC E. CROUSEL
BY Philip Schneider
Louis B. Applebaum
ATTORNEYS

Feb. 6, 1968 L. E. CROUSEL 3,368,202
CORE MEMORY MATRIX IN MULTIBEAM RECEIVING SYSTEM
Filed July 15, 1963 19 Sheets-Sheet 16
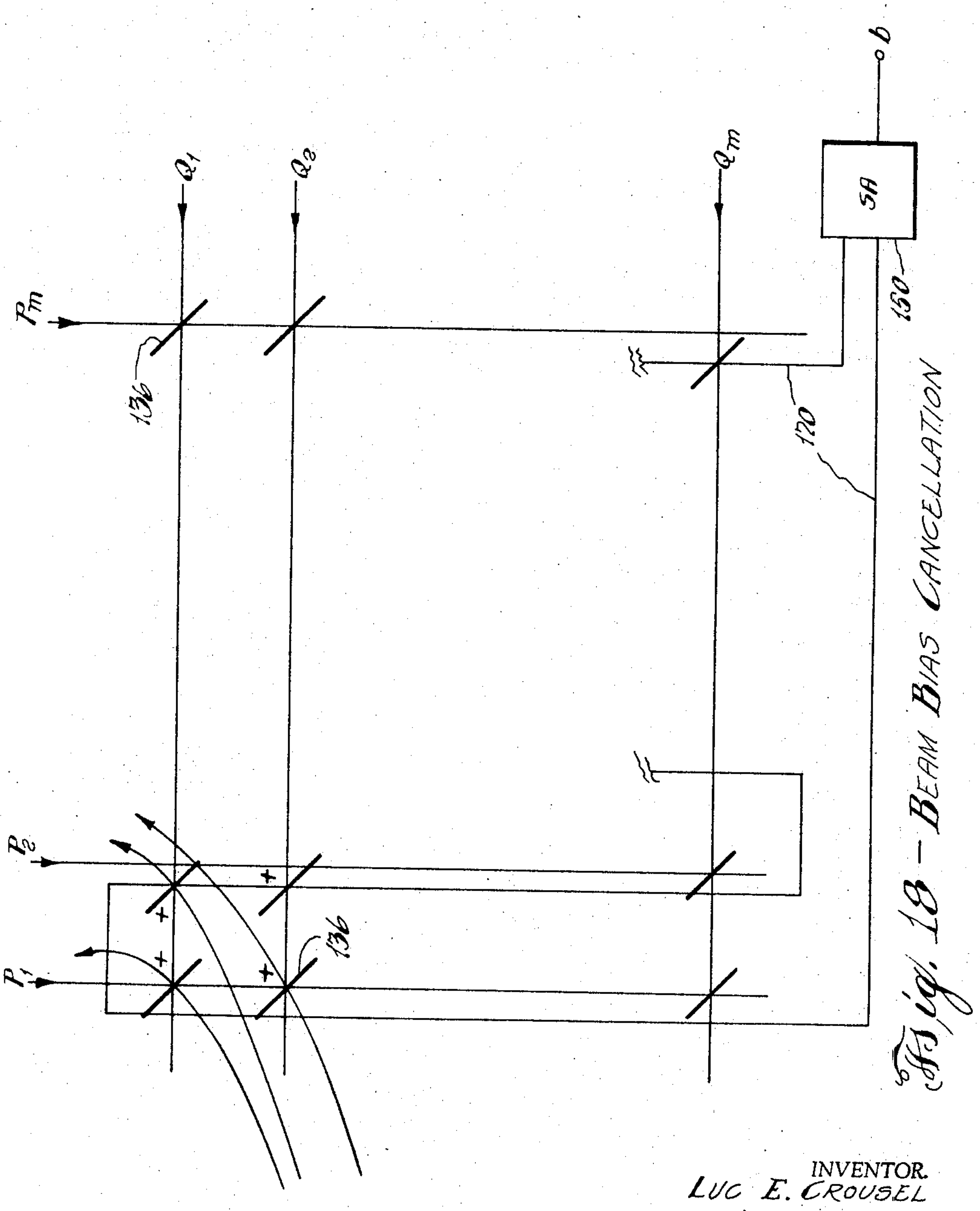
Fig. 18 - BEAM BIAS CANCELLATION
INVENTOR.
LUC E. CROUSEL
BY Philip Schneider
Louis B. Applebaum
ATTORNEYS INVENTOR.
LUC E. CROUSEL
BY Philip Schneider
Louis B. Applebaum
ATTORNEYS INVENTOR.
LUC E. CROUSEL
BY Philip Schneider
Louis B. Applebaum
ATTORNEYS Feb. 6, 1968 L. E. CROUSEL 3,368,202

CORE MEMORY MATRIX IN MULTIBEAM RECEIVING SYSTEM

Filed July 15, 1963

19 Sheets-Sheet 19

INVENTOR.
LUC E. CROUSEL

BY Philip Schneider
Louis B. Applebaum
ATTORNEYS

United States Patent Office 3,368,202

Patented Feb. 6, 1968

3,368,202

CORE MEMORY MATRIX IN MULTIBEAM RECEIVING SYSTEM

Luc E. Crousel, Scarsdale, N.Y., assignor to the United States of America

Filed July 15, 1963, Ser. No. 295,257
12 Claims. (Cl. 340—172.5)

This invention relates to a system for parallel multibeam steering of a transducer array and especially to a core memory matrix for such a system.

The progress of the radar and sonar target detection arts and the construction of huge, multi-unit antenna or hydrophone (hereinafter called transducer) arrays has resulted in a need for electrical steering of the direction of the beam formed by such arrays. An example of a sonar receiving system in which the beam of a multi-unit hydrophone array is electrically steered is the Dimus system described in "Journal of the Acoustical Society of America," vol. 32, No. 67, July 1960.

The direction of the beam of a transducer array depends on the relative phasing of the signals being fed to or derived from the various transducer units which compose the array. (Hereinafter, for the sake of simplicity, only a receiving system will be considered.) The problem then becomes one of phasing, or properly delaying, the signal from each transducer for each beam direction that is desired. However, if it is desired to scan all beam directions simultaneously, the complexity of the system becomes greatly magnified. And if, in addition, the number of transducer units in the array is several hundred or more, the complexity and quantity of physical apparatus required for the Dimus system becomes prohibitive.

The present invention greatly reduces the amount of equipment used in a system like Dimus to perform the functions of demultiplexing, interconnection and summation of phased signals to form beams. It accomplishes this by utilizing a novel memory core matrix and simple delay means like magnetic drum apparatus or sonic delay lines in place of the complicated interconnection network, summation equipment and shift registers which are employed in the Dimus system.

An object of the invention is to provide a system capable of parallel multibeam steering of transducer arrays consisting of hundreds or thousands of transducers.

Another object is to simplify and reduce the number of components used in a beam-steering system like Dimus, especially with respect to the delay, interconnection and summation equipment.

A further object is to utilize a core memory matrix to simplify the interconnection and summation equipment employed by the Dimus beam-steering system.

Other objects and many of the attendant advantages of this invention will be readily appreciated as the same becomes better understood by reference to the following detailed description when considered in connection with the accompanying drawings wherein:

FIG. 1 illustrates the beam equations in matrix and in summation forms;

FIG. 2 illustrates schematically the beam forming functions of the Dimus system;

FIG. 3 illustrates the quantization of a received signal;

FIG. 4(*a*) is a schematic illustration of the multiplexer;

FIG. 4(*b*) illustrates the relationship of the multiplexer gating pulses, or sampling pulses, to the frame period and to the pulse train output of the multiplexer;

FIG. 5 illustrates schematically a system having a multiplexer, serial memory and demultiplexer;

FIG. 6 is a time-delay chart for the system shown in FIG. 5, the demultiplexed signals being shown in rows and columns for several frames;

FIG. 7 is a schematic diagram of a multiplex beamformer system, indicating the various functions performed;

FIG. 8 is a schematic illustration of a delay-organized core beamformer;

FIG. 9 is a schematic illustration of a core matrix demultiplexer showing the timing pulse and receiver inputs;

FIG. 10(*b*) is a curve showing the output pulse derived from a memory core;

FIG. 11 is a schematic illustration of a core memory matrix showing two of the beam sense wires;

FIG. 12 is a schematic representation of the three dimensional geometry of the core memory matrix of the delay-organized core beamformer;

FIG. 13 is a schematic illustration of a beam-organized core matrix;

FIG. 14 is a diagram illustrating the relationships among the timing pulses P, the readout pulses Q, the write cycle and the read cycle for the beam-organized core matrix;

FIG. 18 is a schematic illustration of the manner in which the sense wire threads the cores for bias cancellation;

Figure 19A:
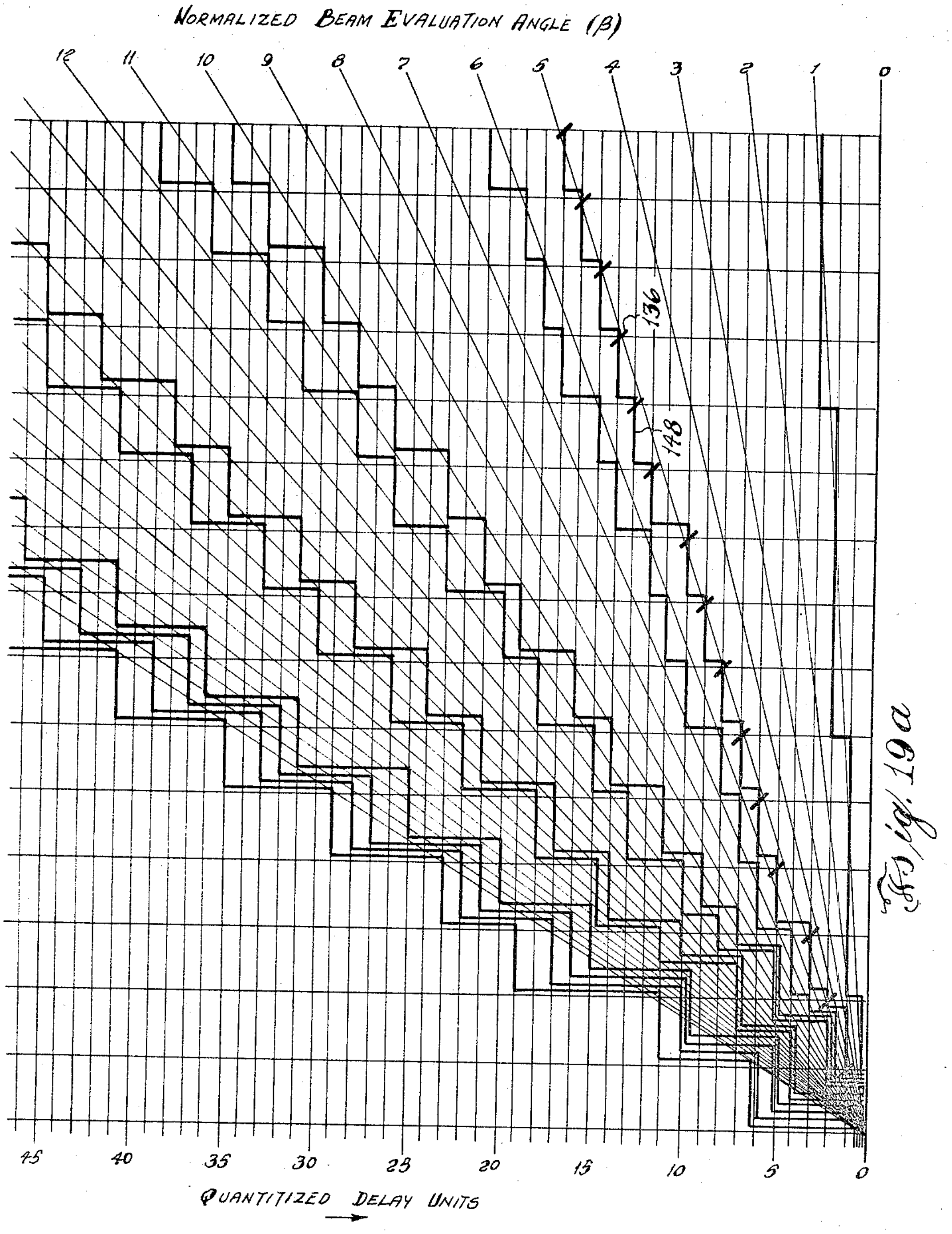
Figure 20:
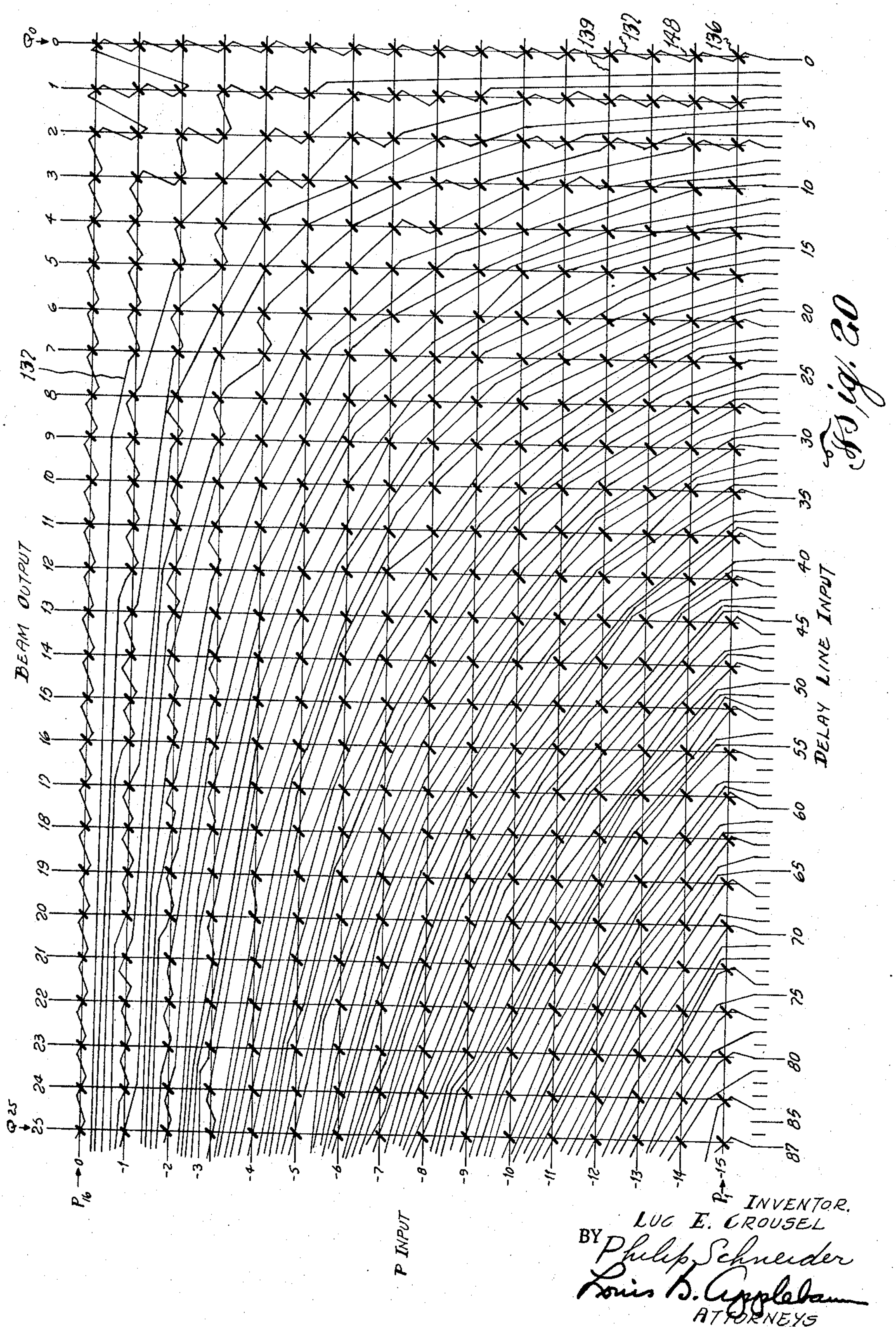

FIGS. 19*a* and *b* are diagrams illustrating more completely the details of a delay-organized core memory matrix; and FIG. 20 is a diagram illustrating more completely the details of a beam-organized core memory matrix.

DEFINITIONS

Before a detailed description of the figures is begun, it would be helpful to consider some definitions of array terminology and to introduce a notation for the presentation of a concise definition of beamforming in the form of equations which allow dissection into individual functions.

A connected set of points over which a field component has a constant phase constitutes a wavefront. Addition of signals from receivers located on a wavefront is coherent with respect to the field component defining the wavefront. This coherent addition produces the array gain or enhancement of discrimination between the desired signal and other components (noise).

Array steering consists in transforming the receiver signals into a coherent set, thus simulating points on a wavefront. This steering can be done either mechanically or electronically. In mechanical steering, the receiving transducers are positioned on the surface of a wavefront. This requires mobility of transducers and restricts steering to single-beam operation. In electronic steering, the receiving transducers are maintained in fixed position but the signals received are stored to produce replicas. The delay between each input and its replica is chosen so that the set of replicas form a synthetic wavefront. Coherent addition is then performed on the replicas. To allow multibeam steering, many sets of replicas are produced simultaneously.

BEAMFORMING EQUATIONS

A beam results from addition of signal replicas, one from each receiving transducer, with a delay structure corresponding to a wavefront. The operation can be expressed analytically by a set of equations in matrix form or a summation equation as shown in FIG. 1. In these equations, $b_i$ denotes the $i$th beam, $a_j$ denotes the signal from the $j$th receiver and $d_i^j$ denotes the delay in the contribution of receiver $j$ to the $i$th beam.

The receiver and beam signals are functions of time, whereas the delays are constants.

BEAMFORMING FUNCTIONS

The beamforming functions performed by the apparatus consist of:

A. *Delay*

From each receiver input $a_j$, a set of increasingly delayed replicas $d_1^ja_j$, $d_2^ja_j$ . . . $d_m^ja_j$ ($i$=1, 2 . . . $m$) is produced. This function also includes storage of the input signals and retrieval after specified delays, if accomplished by a shift register, as in the Dimus system.

B. *Summation*

To form a beam $b_i$, the replicas $d_i^ja_j$ ($j$=1, 2 . . . $n$), one from each receiver and each delayed the proper amount, are summed, for example, in an $n$-input adder. The ensemble of the beams are produced by a set of $m$ such adders.

C. *Interconnection*

Intermediate between delay and summation, the interconnection is defined as a separate function because of its potential complexity. It consists in collection of the replicas of the signal from each receiving transducer and distribution of the replicas to the inputs of the adders.

FIG. 2 illustrates the beamforming functions in a system of the Dimus type. The number of operations in each function is listed below:

| | |
|---|---|
| Delay | $n$ Storage units. |
| Interconnection | Wiring matrix with ($mn$) connections. |
| Summation | $m$ Adders with $n$ inputs each. |

The analog to digital conversion of the input signals is shown in FIG. 3.

The continuous input random processes are converted to binary time series to allow digital processing. The conversion consists of both time and amplitude quantization. Selections of levels and intervals are analyzed in the aforementioned article by V. C. Anderson.

(a) Amplitude quantization is binary, retaining only signal polarity. It is obtained by hard clipping. (By hard clipping is meant the usual process of the formation of square waves by extreme overdriving of one or more amplifier stages until the sides of the input signal become approximately vertical.) A generalized input signal 118 and the resultant clipped signal 120 is shown in FIG. 4.

(b) Time quantization results from sampling and can be combined with multiplexing.

If sampled at time $T_s$, the sample would have positive polarity which in the binary system used with the present invention would be equivalent to a "one" state. If sampled at time $2T_s$, the sample would exhibit negative polarity which would be equivalent to a "zero" state. The "one" and the "zero" states correspond to the two magnetic states of a magnetic core having the so-called square hysteresis loop characteristic, as will be further explained hereinafter.

The beamforming equations for the digital input time series can be represented as in FIG. 1 by $$b_i=\sum_{j=1}^{n} d_i^j a_j$$

where $$a_j=1 \text{ or } 0 \ (j=1, 2 \ldots n)$$

represents the polarity of the sample from receiver $j$, and $d_i^j$ is the quantized delay between input $a_j$ and its replica contributing to beam $b_i$.

The delays $d_i^j$ are multiples of the frame period $T_s$ (see FIG. 3). Using this period as a time unit, delays become integers varying from 1 to $p$ where $pT_s$ is the maximum delay encountered.

$d_i^ja_j$ is a symbolic product which designates the polarity of $a_j$ taken $d_i^j$ periods before the current sampling time.

The beams $b_i$ are also quantized in amplitude and time, since they are assembled from quantized receiver contributions. The amplitude ranges over the integers in the interval (0, $n$). Inherent in this ($n$+1) level quantization is a bias $n/2$ resulting from the 1/2 bias in the logical representation of receiver input polarities by 1 and 0. This bias concept is considered in more detail below.

The beamformer inputs $a_j$ and outputs $b_i$ are time series with the separation between the repetition of corresponding elements being frame interval $T_S$. Thus the beamforming operations repeat at the frame rate $f_s$ of collection and summation.

SHIFT REGISTER BEAMFORMER

The design of a parallel digital beamformer is outlined in the aforementioned article by V. C. Anderson. The configuration as shown in FIG. 2 follows directly from separation of functions.

The inputs 110 are shown generally and comprise transducers and associated quantization, sampling and amplifying equipment.

The delay section consists of a bank of shift registers 112, one for each receiver input, with a number of stages varying between 1 and $p$ in accordance with the delay structure.

The summation is performed in $m$ adders 116, each with $n$ input resistors.

The interconnection 114 consists of point-to-point wiring between the $n$ inputs to each adder and specified taps on the $n$ shift registers.

The number of components is:

| | | |
|---|---|---|
| (1) | Delay | $n$ Shift registers, between 1 and $p$ stages each. |
| (2) | Interconnection | Wiring matrix, $mn$ connections. |
| (3) | Summation | $m$ Adders, $n$ resistor inputs each. |

In large systems, the number of components becomes objectionably high, while the operating speed remains low. Time-sharing techniques offer a variety of ways to trade numbers for speed by converting parallel to serial operation. A progressive transformation of the system functions along these lines is presented in the following sections.

MULTIPLEX BEAMFORMERS

The components of the delay function are reduced by multiplexing the inputs. This allows time-sharing of the storage which must operate at high speed but requires serial access only. Sonic delay lines with magnetostrictive or piezoelectric transducers are an example of delay means which meet these specifications.

A system design based on this principle is detailed below.

*Delay*

Multiplexing can incorporate the time sampling required for digital processing (see FIG. 4). A high speed clock (pulse-generating means) produces $n$ consecutive pulses:

$$P_1, P_2 \ldots P_n$$

each repeating at the sampling rate $f_s$ (frame rate). The pulses drive a set of $n$ "and" gates 122 whose second input consists of the hard clipped (binary) receiver signals ($a_1$, $a_2$, etc.). The gate outputs are combined by an "or" gate 124 into a single multiplex train $a$. The relative timing of the sampling pulses ($P_1$, $P_2$, etc.) and the single multiplex train $a$ is indicated in FIG. 4$b$. It can be seen that the signals from transducers 1, 3 and 4 are of the same polarity and the signal from transducer 2 of opposite polarity.

The delay function is performed in a serial memory (FIG. 5). It consists of $p$ sonic delay lines 126, cut to a length corresponding to one frame period $T_S$. The lines are connected in cascade with the first line fed by the multiplex train $a$. Each of the $p$ delay line outputs $a^1, a^2 \ldots a^p$ is brought out to a demultiplexer. The number of delay lines employed depends on (1) the outer dimensions of the array and the spacing between transducers and (2) the spacing between the two most widely separated beams that are to be formed.

The delay line outputs contain all the data necessary for the beam summation. The format is invariant, and identical to the format of the input multiplex train $a$.

This is illustrated on the time-space chart of FIG. 6. A row represents the samples coming out of delay line $k$ as a function of time. A column represents the outputs of all lines during one sample interval of one frame.

Frames are numbered in the top row, starting with 0 in the most dextral position, designating the current frame. Frames to the left are designated by their age (in frame periods) with respect to this reference.

Thus in row $a^k$ and column $P_j$ frame $o$ we find $a_j^k$, the sample from receiver $j$ with delay $k$.

This is identical to row $a$, column $P_j$, frame $k$, the sample which appeared at the output of the multiplexer $k$ frames earlier at the same gate time $P_j$. This time-space interchange is the essence of the delay function: to spread out geometrically (out of the delay lines) and unify in time (the current frame) what was unified geometrically (the multiplex output) and spread out in time (the sequence of frames).

*Interconnection*

Intermediate between delay and summation is the function of assemblage of received-signal samples for distribution to summers in accordance with the beam equations. To isolate the $n$ samples from each of the $p$ delay line outputs requires a set of $p$ parallel demultiplexers.

Each demultiplexer 129 consists of $n$ "AND" gates 128 (see FIG. 7) with a different delay line output as a common input. The second input to the gates is the set of $n$ timing pulses ($P_1, P_2 \ldots P_n$). Thus the output of demultiplexer $k$ is $a_1^k, a_2^k \ldots a_n^k$, the $k$th delayed sample from the $n$ receivers. The set of demultiplexers produces on $np$ individual lines all the receiver samples required for beam summation.

According to the beam equations, the summation for beam $b_i$ requires the collection of one contribution from each of the receivers at the prescribed delay. This collection is achieved by entering the demultiplexers with order numbers $d_i^1, d_i^2 \ldots d_i^n$ and selecting from successive demultiplexers the signals from gates 1, 2, . . . $n$. The receiver contributions occur in the sequence defined by the timing gates $P_1, P_2 \ldots P_n$, irrespective of the delay structure and may therefore be assembled in an OR gate.

There are $np$ delayed receiver samples present at the output of the demultiplexers. There are $mn$ inputs to the OR gates 132 which assemble the receiver contributions to the beams. Between these two sets, an interconnection matrix 130 is wired in accordance with the required beamforming delay structure. Each of the OR gate inputs obtains one connection, whereas a receiver delay may receive any number of connections between zero and $m$.

*Summation*

The output of each OR gate 132 is a multiplex signal whose sequence of pulses within a frame represents the contributions from successive receivers to the corresponding beam. Summation of these samples produces the beam. Both digital and analog techniques are available for the summation process. Digital summation, for example, may use a counter operating at the multiplex signal rate. Analog summation may be performed by on-off control of uniform current pulses integrated in a capacitor. The summing means for each beam is indicated by a block marked 134 in FIG. 7. One circuit that may be used here is that shown on page 323, FIG. 11–1 of "Pulse and Digital Circuits," Millman and Taub, 1956, McGraw-Hill Book Co., New York. At the end of a frame, time must be allocated for resetting the counters.

Beam output bias can be eliminated by producing a negative count for each 0 contribution, thus restoring symmetry between values assigned to sample polarities (positive and negative are counted as +1 and −1 rather than 1 and 0).

The components required for the multiplex beamformer are listed below according to function:

| | |
|---|---|
| Delay | 1 multiplexer, $n$ AND gates; $p$ delay lines, length $T_s$. |
| Assemblage | $p$ demultiplexers, $n$ AND gates each; $mn$ interconnection wires. |
| Summation | $m$ OR gates, $n$ inputs each; $m$ adders. |

The multiplex beamformer design offers a compact solution to the delay function because of the time sharing of the $p$ lines between the $n$ receivers. The assemblage and summation functions, however, retain the characteristics of the parallel beamformer design. Reduction of equipment to perform these functions is achieved by the use of magnetic components. The employment of matrices of magnetic cores in the assemblage and summation function while retaining the lines for the delay function lies at the heart of the system designs of the present invention.

DELAY ORGANIZED CORE MATRIX BEAMFORMER

Three specific properties of square-hysteresis-loop magnetic cores, such as used in computer memories, offer distinct advantages in designs for assemblage and summation functions of multiplex beamformers:

(a) They can perform the logic of the demultiplexers by virtue of the equivalence between coincident-current core selection and the logic AND function;

(b) Information transfer between wires threading a core results from magnetic coupling, without point-to-point connections between input and output;

(c) Independent time control of input registration and output retrieval is made possible by the memory associated with distinct magnetic remanent states.

The delay-organized core beamformer (see FIG. 8) constitutes the first class of beamformer designs based on these properties and follows the overall organization of the multiplex beamformer as illustrated in FIG. 7.

*Delay*

The delay function is performed exactly as in the multiplex beamformer. A multiplexer combines all receiver inputs into one train $a$ which feeds a cascade of $p$ sonic delay lines 126. The delay line outputs $$a^1, a^2 \ldots a^p$$

are brought out in parallel to a matrix of magnetic cores. In FIG. 8 a different core 136 (denoted by a 45° slash) is located at each intersection 138 of the horizontal wires carrying the delayed $a$ signals and the vertical wires carrying the timing pulse signals P. All cores 136 along a horizontal row contain signals having the same delay but each successive core 136 contains the signal from a successive receiver (or receiving transducer). All cores 136 in a single vertical column contain signals from the same receiver but the signal in successive cores 136 have successive delays, each spaced by one period $T_s$.

The demultiplexing function is performed when a timing pulse and a receiver signal of the same polarity, for example, positive, exist simultaneously on the vertical and horizontal wires, respectively, which thread a core 136. The simultaneous presence of the signals will shift the magnetic state of the core 136 from zero to +1 (i.e., from one polarity of magnetization to the other) whereas the presence of a single signal only does not suffice to change the core's magnetic state. Thus, the concurrence or addition of two signals is necessary to store a signal in any given core.

The multiplexing process results in a geometrically arranged set of signals, as shown in FIG. 9, in which the cores in each column provide signals from a given receiver, each core containing a signal at a different delay. Successive columns contain the signals from successive receivers. Every receiver signal at every necessary delay is thus individually available.

*Assemblage*

The AND gates 128 of the demultiplexers (FIG. 7) can be organized in a rectangular matrix with $p$ rows defined by the delay line outputs and $n$ columns defined by the timing gates (FIG. 9). The matrix element at the intersection of row $k$ and column $j$ constitutes an AND gate with inputs $a^k$ from delay line $k$ and $P_j$ from time gate of receiver $j$ thus producing $a_j^k$, the sample from receiver $j$ with delay $k$.

Figure 10A:
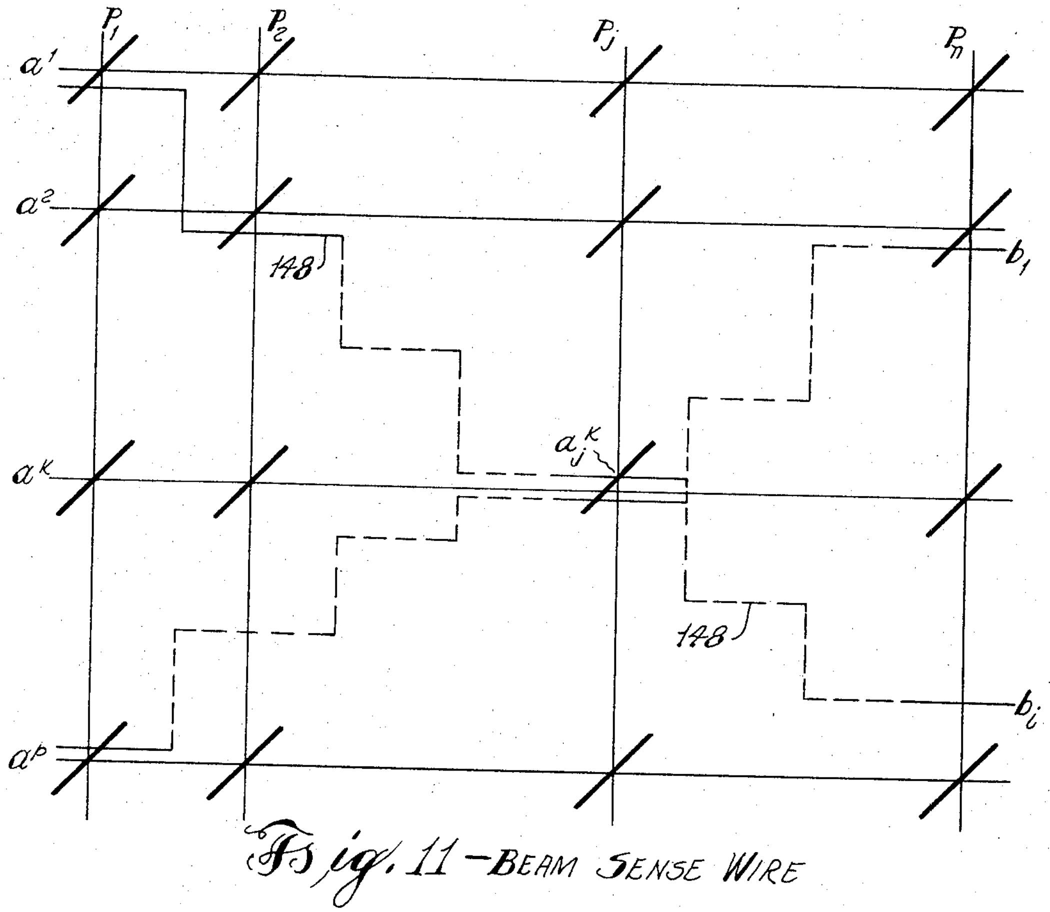
FIG. 10(*a*) is a curve showing the hysteresis loop of a memory core.

The gates used are square-hysteresis-loop memory cores 136 symbolized by a 45° slash at the core matrix intersections 138. The AND function is performed by coincident-current core selection. This is illustrated in FIG. 10*a* on the square hysteresis loop 140 of a magnetic core. The magnetic flux density B is plotted against current I through the core. If the core is in the negative remanent state at position 142, the current from either the $a^k$ or the $P_j$ signal alone is insufficient to drive the core into positive magnetization. However, the concurrence of both signals drives the core to point 144 on the hysteresis loop and, when both signals are removed, the core returns to its positive magnetic remanent state (point 146). The positive remanent state is designated the one state, or condition, of the core and the negative remanent state the zero condition of the core herein.

Figure 10B:
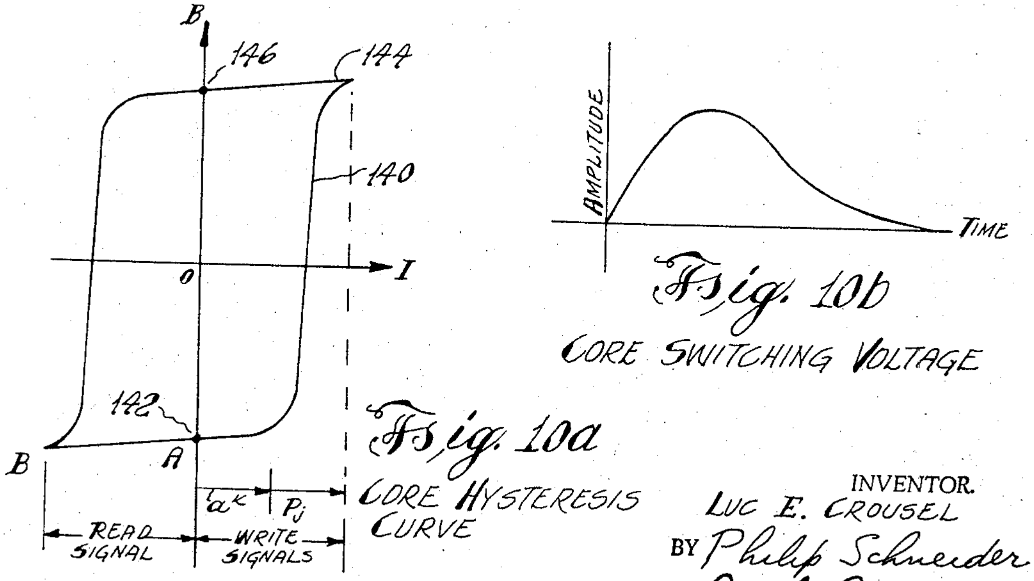

When the condition of the core is switched from one magnetic state to the other, the core provides an output voltage in a wire threaded through the core. The output comprises a pulse signal with rounded corners so that, in practice, the signal looks something like a Rayleigh curve (FIG. 10*b*).

The core matrix operation consists of a succession of memory cycles. A memory cycle contains a write cycle which encompasses the sequence of timing gates $$P_1, P_2 \ldots P_n$$

and a read cycle which spans the remainder of the frame (R in FIG. 4*b*).

The continuous sequence of memory cycle is initiated at the beginning of a write cycle with a pulse from time gate $P_1$. At that time all the memory cores are in the same negative magnetic remanent state called ZERO.

Each of the $p$ parallel outputs from the delay lines controls a driver amplifier 131 (see FIG. 9) which sends a half select current through the corresponding row (delay wire) in the matrix when the line output is a logic ONE (positive polarity sample) and remains quiescent when the line output is a logic ZERO (negative polarity sample). (A half select current is defined as half the current required to switch a core from one remanent state to the other. A full select current is the current required to switch the remanent state of a core. Thus, in FIG. 10*a*, both signal $a^k$ and $P_j$ are half select currents. The read signal is a full select current.) The driver amplifier 131 may simply be an amplifier normally biased beyond cutoff which is made to conduct by the application of a pulse of positive polarity.

The timing gate pulses $$P_1, P_2 \ldots P_n$$

control sequential switching of the half select current pulses from a sampling pulse means 121 into the $n$ columns (receiver wires) of the array. The sampling pulse means 121 comprises suitable pulse generator, switch and driver amplifier equipment.

Separate row and column analysis of the memory write cycle may help visualize its operation.

Looking down vertically:

During the interval of the pulse from time gate $P_j$, the vertical driver amplifier produces a half select current pulse which is switched into column $j$ of the matrix. At the same time the $p$ delay lines produce the $j$th receiver component of their multiplexer train (see timing chart, FIG. 6).

These are the $p$ last-time samples from receiver $j$. Each delay line which has a logic ONE output (positive sample) commands its amplifier to drive a half select current in the corresponding row (delay wire).

Half select current coincidences impress the cores in column $j$ with the samples:

$$\begin{matrix} a_j^1 \\ a_j^2 \\ a_j^3 \\ \vdots \\ a_j^p \end{matrix}$$

Other columns are left intact. The content of the $j$th column is identical to that of a shift register of length $p$ fed at the top with the $j$th receiver samples.

Entering the core matrix horizontally:

Row $k$ of the matrix is energized by $a^k$, the multiplex train with delay $k$.

As consecutive receiver samples coming from delay line $k$ control half select current pulses in row $k$, the timing gates $$P_1, P_2 \ldots P_n$$

distribute these samples in the row of cores by switching half select current sequentially into the columns of the matrix. The resultant core row content is $$a_1^k, a_2^k \ldots a_n^k$$

the set of $k$th delayed samples from all receivers. This is identical to the output of a demultiplexer fed from the $k$th delay line.

The core matrix content at the end of the write cycle is $$\begin{matrix} a_1^1, & a_2^1, & a_3^1 & \ldots & a_n^1 \\ a_1^2, & a_2^2, & a_3^2 & \ldots & a_n^2 \\ a_1^3, & a_2^3 & \ldots & & \\ \vdots & & & & \\ a_1^p & \ldots & a_n^p & & \end{matrix}$$

All receiver samples required for beam summation are thus available in individual geometric locations. This is opposed to their time sequential, geometrically shared availability at the output of the delay lines.

The core matrix content is identical to that of a bank of $n$ parallel shift registers with $p$ stages (*cfr*, shift register beamformer) and similar to the $np$ demultiplexer outputs of the multiplex beamformer (FIG. 7).

*Summation*

The summation of beam $b_i$ $$b_i = d_i^1 a_1 + d_i^2 a_2 + \ldots + d_i^n a_n$$

requires the collection of one contribution from each receiver. The contribution from the $j$th receiver $$d_i^j a_j = a_j^k \quad (\text{for } d_i^j = k)$$

is in column $j$, at the intersection with row $d_i^j$, where $d_i^j$ is an integer between 1 and $p$, say, $k$. Thus one core in each column contributes to the beam, the row being determined by the required delay structure. To collect all these contributions, a single wire, the beam sense wire 148, is threaded through the corresponding cores (see FIG. 11).

As shown in FIG. 8, each beam wire 148 is connected to an integrating sense amplifier 150 and summation can be performed during the memory write cycle by strobing the amplifier 150 with a sequence of pulses properly phased with respect to the timing gates $P_1$ to $P_n$ for optimal discrimination of the core switching voltages from the noise background, i.e., the strobing pulses are phased to occur when the core output voltage (switching voltage) is near its maximum value. The strobing pulses activate the amplifier 150 which is normally biased beyond cut-off. The output is fed to an integrating circuit for summation. The type of sense amplifier circuit which can be employed here is shown in Fig. 12.83, page 12.88 of Huskey and Korn, "Computer Handbook," McGraw-Hill Book Co., 1962. This book also shows integrating circuits on page 2.8 and 2.9, FIG. 2.2.1*e* and *f*.

Another way of accomplishing the same result is to apply the output pulses of the amplifiers to digital counters for summation.

Another method of beamforming is to form all beams simultaneously after the write cycle has been completed. In this method, the reset pulse is used as the read signal. All cores whose state is switched by the reset pulse simultaneously induce a switching voltage on their beam wires. The sense amplifiers are strobed at the same time the reset pulse is applied to the reset wires and the voltages on the beam wires are integrated by the amplifiers associated with the respective beam wires to give the beam outputs.

At time $P_j$ the amplifier senses the contribution from the *j*th receiver $$d_i^j a_j = a_j^k \quad (\text{for } d_i^j = k)$$

The information transfer through the core is thus performed through a transformer action, without reliance on its memory characteristic: if input currents $a^k$ and $P_j$ coincide, core $a_j^k$ switches and induces a voltage in sense wire $b_i$.

Core contributions to a beam appear in the sequence of the timing gates $$P_1, P_2 \ldots P_n$$

at the sense amplifier output. Summation of this multiplex train is then completed in a digital or analog counter. The techniques are identical to those mentioned previously.

To complete the memory cycle, it is necessary to return all cores to the reset (ZERO) state, so the next memory cycle can commence with a clear memory. This reset function is performed during the read cycle which occupies the balance of the complete frame $T_s$ (FIG. 4). A full select current is driven through a reset wire which threads all cores in the matrix entering them with a polarity opposite to that of the write-current wires.

The cores which return to the ZERO state under the action of the reset current induce switching voltages (i.e., output voltages) in the beam wires. The cumulative voltage on each of these beam wires is—within the uniformity of switching voltage characteristics—proportional to the beam count. The receiver contributions to a beam, which appeared as a sequence of voltages induced in the beam wire during the write cycle, appear simultaneously on the same wire—in opposite polarity—during the read cycle.

It is therefore possible to perform the beam summation during the read cycle rather than the write cycle by strobing the sense amplifier into its conductive state at the time at which the reset pulse is applied to the cores.

A considerable hardware reduction ensues through the elimination of the counters. The beam wires themselves act as summers by the addition of induced switching voltages in the sense wire loop.

This method of readout makes efficient use of the memory property of the cores as opposed to the logic AND function and transformer function used in the preceding scheme. It presents the additional advantage of decoupling the sense amplifiers from the multiplicity of write current transients in the delay wires (rows).

The penalty of this beam readout technique is the reliance on the uniformity or peak amplitude and peaking time of voltages induced in the beam wires by switching cores. This penalty is reduced by integrating the beam sense amplifier outputs. Accuracy then rests with uniformity of total core flux change between remanent states.

The delay-organized core matrix beamformer, which is illustrated in FIG. 8, has the following components listed according to function:

| | |
|---|---|
| Delay ------- | 1 multiplexer; *n* AND gates; *p* delay lines, length $T_s$. |
| Assemblage --- | core matrix: *p* rows (delays); *n* columns (receivers); *m* sense wires (beams). |
| Summation --- | *m* integrating sense amplifiers. |

The merit of this design over the preceding multiplex beamformer (FIG. 7) is the drastic reduction in interconnection and summation:

(a) The *mn* point connections are replaced by threadings of *m* sense wires through *n* cores each. This is accomplished by virtue of the magnetic coupling characteristic of the cores.

(b) The OR gate and adder functions are assumed by the beam sense wire, thus eliminating a set of *mn* isolating elements (OR gate inputs) and *m* counters. This is accomplished by virtue of the memory, or storage, characteristic of the cores.

The stress in the design is centered on the delay wiring For all its advantages, the design suffers from an irparallel.

For all its advantages, the design suffers from an irregular distribution of sense wires over the cores, as specified by the delay structure. If there are 10 beams which call for the same delay *k* in the contribution from receiver *j*, then 10 beam sense wires will thread core $a_j^k$. (In FIG. 11, two of these beam wires are shown threading core $a_j^k$.) The problem can be alleviated by the use of arbitrary delays between beams, but may still require duplication of core matrices in large beam systems. The problem can be eliminated altogether by resorting to a change in definition of the core matrix geometry.

BEAM-ORGANIZED CORE BEAMFORMER

The array geometry of the delay-organized core beamformer which is shown in FIG. 8 results from a plane projection of a 3-dimensional point set (see FIG. 12).

The dimensions of this set are:

(1) the delay *d*, individual delays being represented by the line outputs $a^p$.

(2) the receivers *a*, outputs from individual receivers being represented by the $a_n$ terms.

(3) the beams *b*, individual beams being represented by the beam sense wires $b_m$.

The beam equations associate a delay, $d_i^j$, with each receiver-beam combination $(b_i, a_j)$. In 3 dimensional space, the beam wires are obtained by joining all the points $(b_i, a_j, d_i^j)$ which have a fixed index *i*. These points lie in vertical planes $b_i$ parallel to plane $(d, a)$. By perpendicular projection of all these planes on the $(d, a)$ plane, the delay-organized core array geometry defined in the section above is obtained: The delay and receiver wires $(d, a)$ define the horizontal and vertical dimensions of the array. The beam wires form patterns in the array, each beam wire threading one core in each column.

If $d_i^j = d_r^j = k$, then beams $b_i$ and $b_r$ command the same contribution from receiver *j*, namely $a_j^k$, so that the two beam wires thread the same core. This constitutes a serious impediment to the use of this core array geometry in large beam systems.

Reverting to 3 dimension space, a different geometry is obtained by joining all the points ($b_i$, $a_j$, $d_i^j$) for which the delay is a constant $d_i^j=k$. These points lie in a horizontal plane $d_k$ (parallel to $b$, $a$). By perpendicular projection of all these planes on the ($b$, $a$) plane, one obtains a different core array geometry. The beam and receiver wires ($b$, $a$) define the horizontal and vertical dimensions of the array while the delay wires $d$ form patterns in which each core is threaded once and only once.

To analyze the delay wiring patterns (see FIG. 13), it is observed that each core element, for example, $c_i^j$ at the intersection of row $i$ and column $j$, is associated with a particular beam and receiver, in this case beam $b_i$ and receiver $a_j$. Its function is therefore unique and consists in the transfer of the contribution from receiver $a_j$ to beam $b_i$, namely, $d_i^ja_j$. The delay wire which threads this core has an index $d_i^j$. The path of this delay wire is determined by joining the elements of equal value in the delay matrix, $D=d_i^j$. This establishes a one to one correspondence between the physical core matrix element $c_i^j$ and the mathematical delay matrix element $d_i^j$. The resulting matrix which is shown in FIG. 13 has orthogonally arranged beam and receiver (or timing pulse) wires 148 and 154, respectively, and curved delay wires 152.

The timing pulses $P_1, P_2 \ldots P_n$ for sampling the received signals are produced by a sampling pulse means 121 and applied to the multiplexer AND gates 122 and to the columns of cores in the memory matrix. The receiving means 112 include hydrophone transducers and the electronic equipment needed for hard clipping the received signals. The P timing pulses are applied to the AND gates 122 and the memory matrix only during the sampling period (write period) of each frame.

The sequence of operations of the core beamformer is unaltered by the change in matrix configuration: The delay function is performed with a multiplexer and a cascade of sonic delay lines. Assemblage and summation are combined in the core matrix. The only change is in the geometrical distribution of the components of the beam summation. These are spread out in the core matrix during the memory write cycle. The core rows act as demultiplexers with the timing pulses $$P_1, P_2 \ldots P_n$$

common to all rows controlling the time separations of the multiplex trains coming from the delay lines. However, there is not a direct association of each delay line output with a demultiplexer, as was the case in the delay-organized beamformer. Some delay line output components may never be taken out, whereas others may be extracted several times in different cores. This is dictated by the beamforming structure. Reverting to the example above, if $d_i^j=d_r^j=k$, then beams $b_i$ and $b_r$ command the same contribution from receiver $j$, namely; $a_j^k$. Cores $c_i^j$ and $c_r^j$ in the matrix, which are called upon to store these contributions, will have identical content. They have in common their two write wires: the column wire $P_j$ carrying the timing pulse corresponding to receiver $a_j$ and the delay wire $a^k$ carrying the multiplex train with $k$ frames delay.

*Write cycle*

A separate row and column analysis of the write cycle is again presented as a guide in visualizing the matrix space-time format.

ENTERING HORIZONTALLY

The cores in row $i$ extract from the delay lines the components of beam $b_i$: At time $P_j$, core $c_i^j$ 156 has a column selection which extracts the $j$th receiver component from delay line $d_i^j=k$. At the end of the write cycle the core content of row $i$ is equal to the components of beam $b_i$ $$d_i^1a_1, d_i^2a_2 \ldots d_i^na_n$$

LOOKING DOWN VERTICALLY

During time gate $P_j$, the delay lines produce the $j$th receiver component of their multiplex train. Each vertically successive core is impressed with the value of the delay line which traverses it, leaving a vertical trace $$\begin{matrix} d_1^ja_j \\ \cdot \\ \cdot \\ d_i^ja_j \\ \cdot \\ \cdot \\ d_m^ja_j \end{matrix}$$

which is the set of contributions of receiver $j$ to the beams.

The core matrix at the end of the write cycle contains the receiver samples already organized according to the beam equations $$\begin{matrix} d_1^1a_1, d_1^2a_2 \ldots d_1^na_n \\ \cdot \quad \cdot \quad \cdot \quad \cdot \quad \cdot \\ d_m^1a_1, d_m^2a_2 \ldots d_m^na_n \end{matrix}$$

*Read cycle*

The change in core geometry does not affect the beam summation during the read cycle. A full switching current is driven through the whole array, thus forcing all cores to the reset (ZERO) state. The cumulative voltage induced on the (horizontal) beam wires is sensed in a bank of amplifiers, thus producing signals proportional to the beam counts.

While the method of beam summation just described produces parallel beam outputs, it is often desirable to multiplex these for recording and processing. The beam-organized core geometry allows this time multiplexing to be performed within the array through selective rather than collective readout. Selective readout is possible in this configuration because each core performs only one function. It results from an interchange of the sense and reset wires. The horizontal wires defining the beams ($b_m$) are used as read (reset) wires. The wire linking all cores and previously used for simultaneous reset is now used as a sense wire 158 (see FIG. 15—the sense wire is not shown completely in order to avoid confusion from too many lines in the diagram). The readout sequence is controlled by a series of timing pulses $$Q_1, Q_2 \ldots Q_m$$

similar to the input timing pulses ($P_j$) and spread sequentially over a read cycle (FIG. 14) which occupies a larger fraction, perhaps one-half, of the frame period.

At time $Q_i$, a full reset current is driven into the cores of row $i$, inducing in the sense wire 158 a cumulative voltage proportional to $$d_i^1a^1+d_i^2a_2 \ldots + d_i^na_n$$

representing the count of beam $b_i$. As the reset pulses ($Q_i$) turn on in sequence, the single sense amplifier which terminates the sense wire is strobed by a series of strobing pulses Q. The amplifier produces a series of pulses whose amplitudes are proportional to the successive beams $$b_1, b_2 \ldots b_m$$

This beam multiplex signal contains all beam information. It has the same frame rate as the input multiplex of receiver inputs. This may not be required however because the criteria which determine sampling rates in receivers and beams are different. Receiver sampling rate is dictated by beamforming delay quantization whereas beam sampling is dictated by spectral separation such as the Nyquist criterion. Typically the beam sampling rate can be reduced to half the receiver sampling rate. This can be used to advantage in the core beamformer to reduce operating speed or to increase capacity without increasing speed. A convenient way to use this property is to allow a full frame for both the memory write and read cycle, and prevent the delay lines from delivering their output multiplex trains to the core memory drivers during the read cycle.

Whether readout is parallel or sequential, the beam output accuracy depends on the uniform amplitude of core-switching voltages as sensed at the amplifier 150. Uniform amplitude, in turn, depends on proper timing of the sense amplifier gating pulse relative to the maximum point of the core-switching voltages. Also, along a sense wire, propagation time differentials between core voltages are appreciable and adversely affect beam accuracy. But integration of the amplifier output during each reset drive ($Q_1$) can be employed to make the beam accuracy dependent on the uniformity of core flux difference between remanent states rather than the previously mentioned factors.

Figure 15:
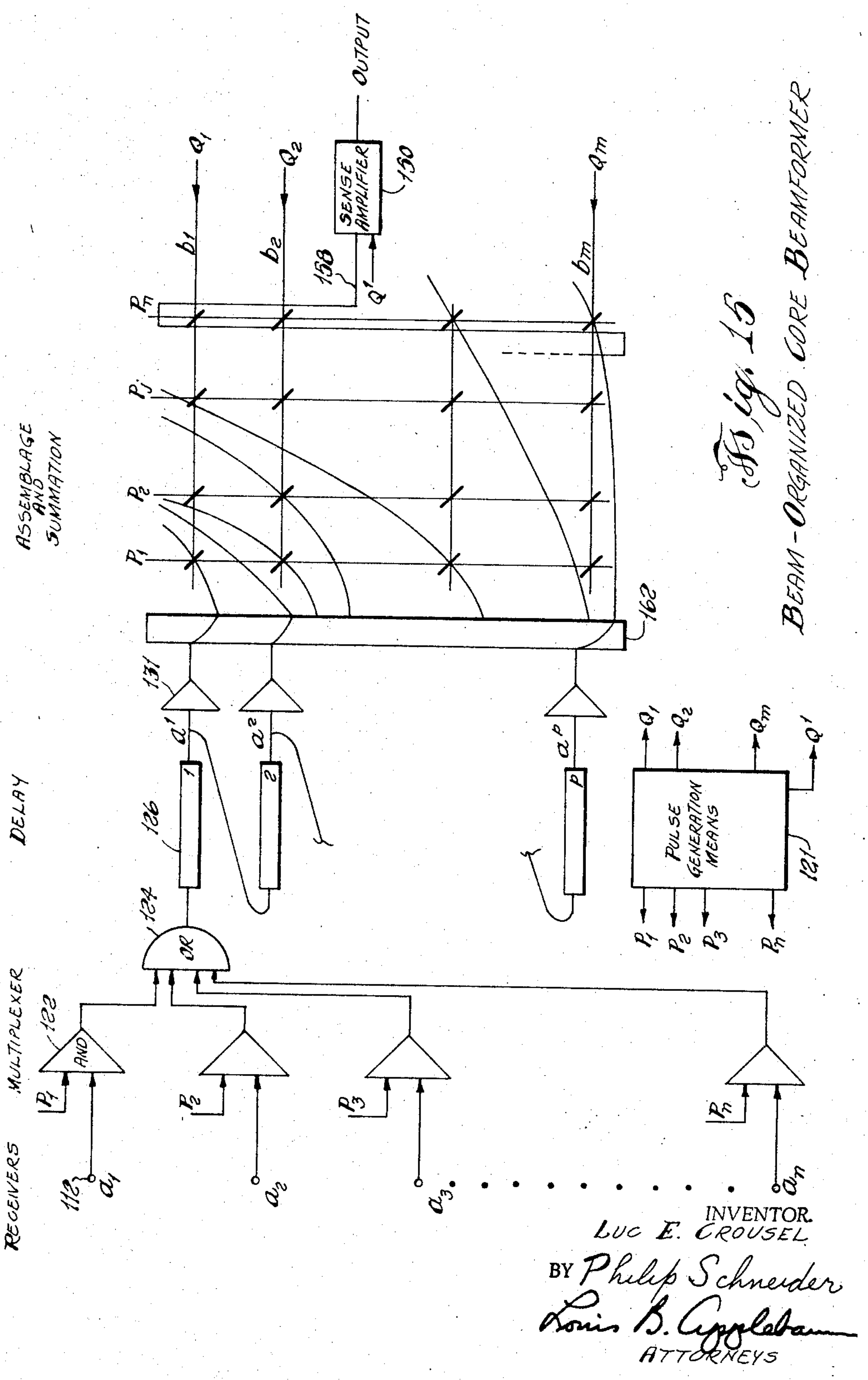
FIG. 15 is a schematic representation of a beam-organized core beamformer.

The system configuration of the beam-organized core beamformer is illustrated in FIG. 15. Components are listed below according to functions:

| | |
|---|---|
| Delay | 1 multiplexer, $n$ AND gates; $p$ delay lines, length $T_s$. |
| Assemblage | core matrix: $m$ rows (beams); $n$ columns (receivers); $p$ delay wires. |
| Summation | 1 sense amplifier. |

A terminal board 162 may be optionally included for facilitating connection between the matrix delay wires and the delay line output wires.

It offers several advantages over the previous beamformer configuration:

(a) Only 4 wires thread each core (1) the receiver wire (vertical)
(2) the beam wire (horizontal)
(3) delay wire (delay pattern)
(4) the sense wire (through all cores)

Hence core size and drive is no higher than in conventional core memories;

(b) Only one sense amplifier with integration is required—the concurrent increase in reset drive is handled with one current pulse generator and a bank of switches;

(c) The beam outputs are presented in multiplex format.

The quantized receiver inputs are multiplexed onto a single information channel. This operation produces a signal which is convenient for monitoring, recording and transmission.

The multiplex train signal "*a*" is fed into a cascade of $p$ delay lines, the length of each being equal to the frame period. This string of lines completes the delay function.

In the core memory, the information from the delay lines is spread out in a format dictated by delay structure and collected by summation according to beams. This is a two-phase operation: the write cycle with timing gates $P_1, P_2 \ldots P_n$ which registers successive receiver data in the array; the read cycle with timing gates $Q_1, Q_2 \ldots Q_m$ which sums consecutive beams and presents them in multiplex at the amplifier output.

All pulses are derived from a pulse-generating means 121 comprising a clock oscillator, flip-flop counter circuits and decoder circuits, all of which are conventional to the computer art. (For example, see circuits in chapter 4 of "Pulse and Digital Circuits" by Millman and Taub.) The pulse-generating means 121 produces the set of sampling pulses P, the set of beam deriving (or reset pulses Q), and the sense amplifier strobing pulses Q'.

In summary, two types of matrices can be employed in the beamformer systems, namely the delay-organized and the beam-organized matrices. With each of these matrices, the beamformer equipment may be organized to provide either parallel or sequential beamforming. A parallel beamforming operation is indicated in FIGS. 7 and 8 and a sequential beamforming operation in FIG. 15.

LARGE SYSTEM DESIGNS

For systems with multitudinous inputs and outputs, the beam-organized core matrix beamformer cumulates the advantages of successive designs. Input and output are in multiplex format. This is valuable for monitoring and recording and simplifies connection with peripheral equipment. Delay is compact through time sharing of delay lines by all receivers. Assemblage and distribution of data from input to output is wired in a matrix, interconnection is performed by magnetic coupling, beamforming programs are changed by substitution of core matrices. Summation is in the wiring and driving, without use of counters. Output circuitry is time shared between beams.

The dimensions of the core plane correspond to the system parameters: $m$, the number of beams and $n$, the number of receivers.

When both parameters are in the order of a hundred, the beamformer can be implemented with a single core plane. When either one or both parameters exceed this range, several planes have to be used. The organization depends on which of the parameters exceeds the range.

*Large number of inputs*

Even with a large number of inputs, the delay function can be performed in a single cascade of delay lines.

Figure 16:
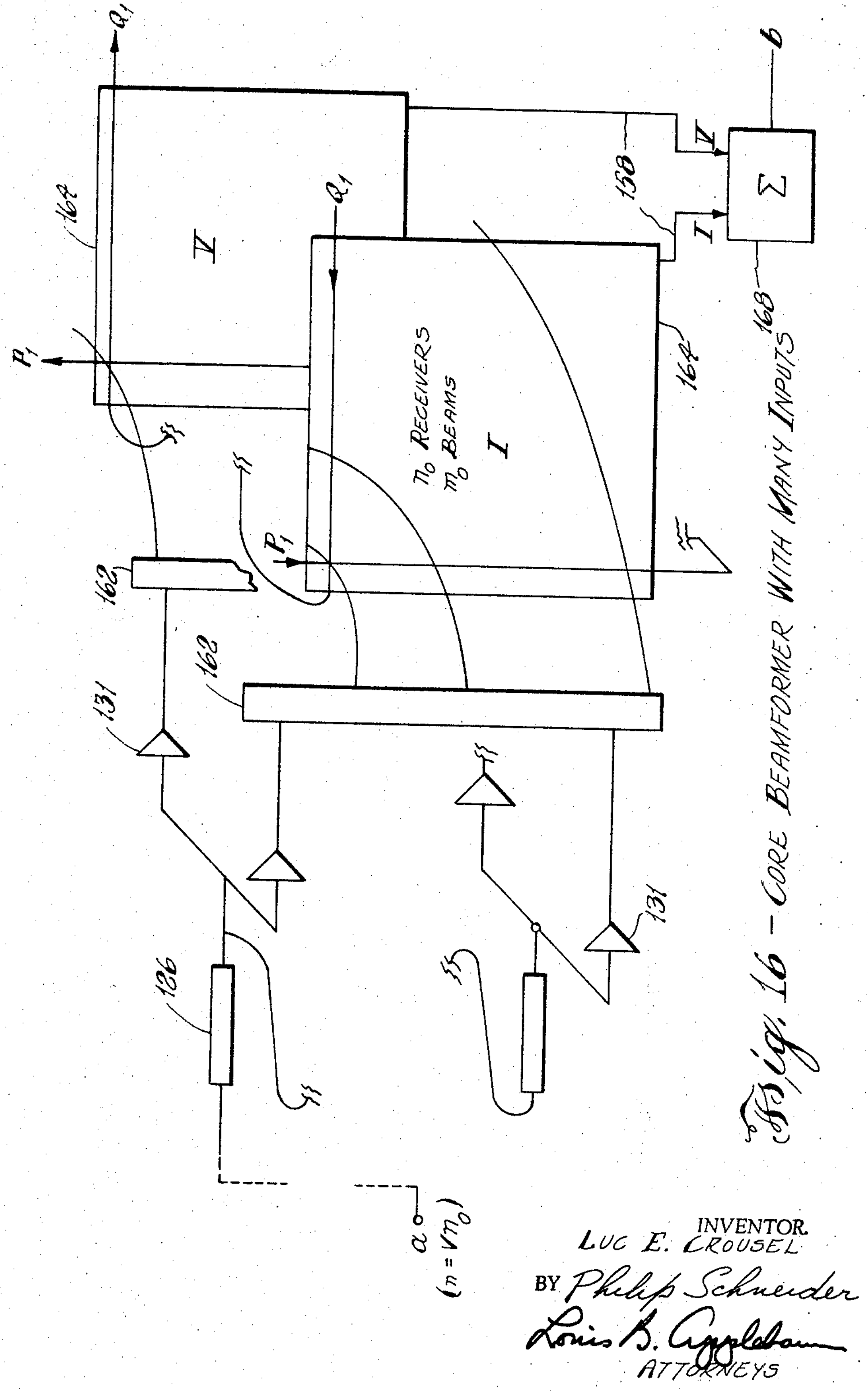
FIG. 16 is a schematic illustration of a technique for arranging a core beamformer with many inputs.

The collection and summation however cannot conveniently be handled in a single plane when the number of inputs exceeds values of the order of 100. An array size is then chosen so that $$n = \nu n_0$$

where
$n$=total number of receivers
$n_0$=number of receivers accommodated in one core plane
$\nu$=integer The configuration is illustrated in FIG. 16. The receivers are distributed over $\nu$ core planes 164, operating simultaneously. This requires individual delay drivers 131 in each plane, each carrying multiplex delays of the corresponding receivers. These are obtained by partial demultiplexing of the delay line outputs in $\nu$ channels corresponding to the receivers accommodated in the $\nu$ planes. Vertical half select current pulses $P_1, P_2 \ldots P_{n_0}$ are common to all planes and so are the horizontal reset current pulses $Q_1, Q_2 \ldots Q_m$. All planes thus operate in parallel. Sense wires are threaded through the individual planes and produce an output of $\nu$ parallel multiplex signals, each containing $n_0$ contributions to the beams. Synchronism between planes allows formation of the beams by summation of the $\nu$ partial-beam multiplex channels, for example, by resistive summing means 168.

*Large number of outputs*

The input and delay section is unaffected by an increase in the number of beams. The core array must be expanded and this proceeds by repetition of equipment without increase in complexity.

A convenient array size is chosen so that $$m = \mu m_0$$

where
$m$=total number of beams
$m_0$=number of beams accommodated in one plane
$\mu$=integer Planes are fitted in the same stack or in separate stacks, dependent on the number of inputs and outputs. The output format is a set of $\mu$ multiplex signals, each containing a sequence of $m_0$ beams.

Figure 17:
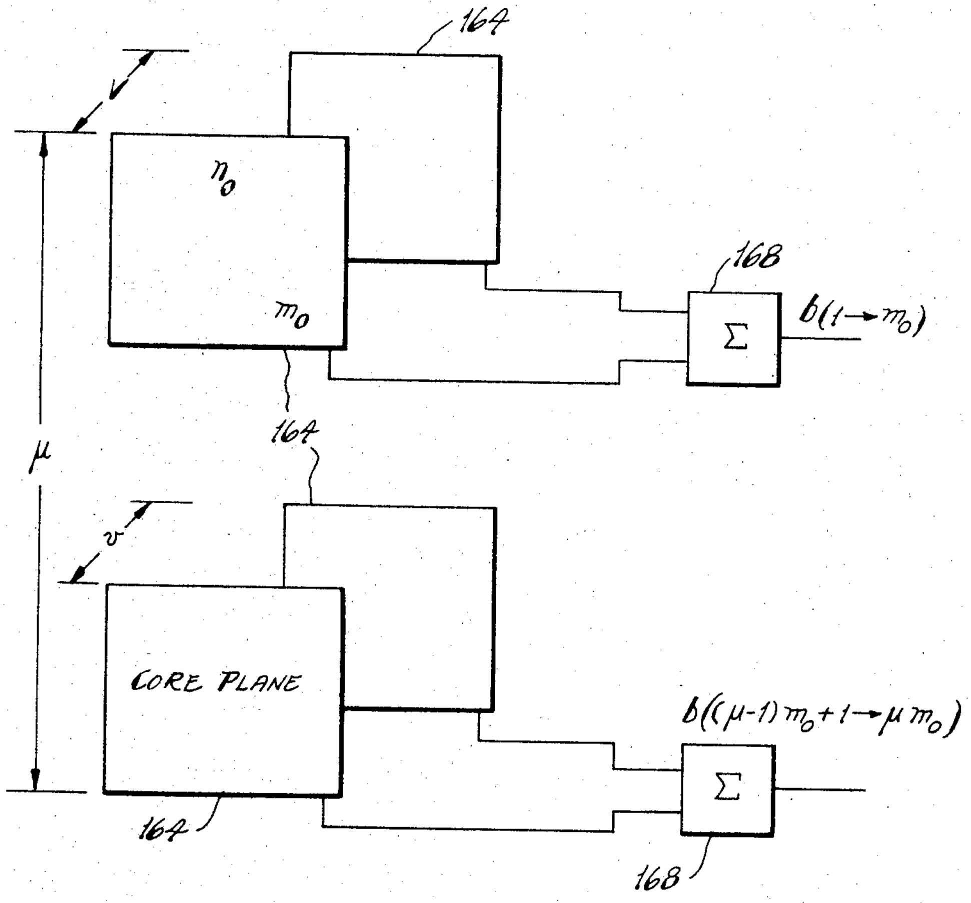
FIG. 17 is a schematic illustration of a technique for arranging a core beamformer with many inputs and outputs.

The configuration is illustrated in FIG. 17. It shows a system in which both the number of receiver inputs and the number of beam outputs exceeds the capacity of one core plane 164. Each stack of $\nu$ core planes ($m_0$ x $n_0$) is made to handle all inputs to a subset of $m_0$ beams. A total of $\mu$ such core memories performs the complete beamforming function.

CANCELLATION OF AVERAGE BEAM COUNT

The ONE and ZERO logical representatation of the binary quantization levels of receiver inputs introduces a bias in the beam outputs, if a straight addition is performed. Since this bias is larger than the variations about it, which represent the useful information, a sizeable portion of the dynamic range in the beam output circuitry is wasted.

In the beamformers which use a counter to sum the individual receiver contributions, the bias can be removed by using an adder-subtractor. A logical ONE receiver contribution initiates a positive count, a logical ZERO initiates a negative count.

In the core beamformer, which performs the beam count by the addition of switching voltages in the beam sense wire, it is not possible to implement the bias cancellation in this manner. This results from the fact that opposite core-drive-polarities are assigned to write and read operations. Bias cancellation can be obtained however by partitioning the inputs in 2 complementary subsets whose sums have opposite means. The scheme consists in (1) Inverting the inputs from one set, and
(2) Adding the two sets with opposite polarities The table below summarizes these operations and assigns parameters to the number of inputs in the various classes.

| Input | | Input Set 1 | | Input Set 2 | |
|---|---|---|---|---|---|
| Polarity | Number | Digit | Number | Digit | Number |
| + | $u$ | +1 | $p$ | −0 | $r$ |
| − | $v$ | +0 | $q$ | −1 | $s$ |

Thus in set 1 the inputs are taken directly whereas in set 2 the inputs are inverted. The number of inputs of each type are random variables related by the equations.

The total number of inputs: $n=u+v$
The total number of 1 inputs: $u=p+r$
The total number of 0 inputs: $v=q+s$
The total number of inputs in set 1: $n/2=p+q$
The total number of inputs in set 2: $n/2=r+s$ In the core beamformer it is convenient to assign the odd inputs $a_1, a_3 \ldots a_{n-1}$ to set 1 and the even inputs $a_2, a_4 \ldots a_n$ to set 2. The average count cancellation is then implemented by (1) Complementing (inverting) the even inputs before multiplexing. (This provides the inversion of set 2 at the output of all delay lines.)

(2) Threading the sense wire in opposite directions through the consecutive core columns: the voltage induced in the sense wire by cores switching in set 1 and in set 2 thus have opposite polarities.

The geometry of the sense wire 170 is illustrated in FIG. 18. The mechanism of bias cancellation is derived below. Neglecting the spread of peaking time and peak voltage of individual core characteristics, all cores switching from ONE to ZERO state induce a voltage $e_1$ in the sense wire, with polarity dependent on the bias set membership (parity) of the column. Similarly all cores which are disturbed from ZERO remanent state induce a small voltage $e_0$. The sense signal moves these cores from point A to point B along the hysteresis curve (FIG. 10) and the small slope of the curve along this path induces a small voltage, which may be termed the disturbance voltage or signal, in the sense wire.

The cumulative voltage induced in the sense wire by resetting the cores on a beam wire with input numbers defined by the parameters of the table is $$e_b=(p-s)e_1+(q-r)e_0$$

where $pe_1$ is the contribution from the ONE cores in set 1
$-se_1$ is the contribution from the ONE cores in set 2
$qe_0$ is the contribution from the ZERO cores in set 1
$-re_0$ is the contribution from the ZERO cores in set 2

Using the relations above $$s=n/2-r$$
$$q=n/2-p$$

The output voltage becomes $$e_b=(p+r-n/2)e_1+(n/2-p-r)e_0$$
$$=(u-n/2)e_1-e_0)$$

i.e. the beam voltage $e_b$ is proportional to the (biased) beam count ($u$) with bias ($n/2$) removed, or $$u-\frac{n}{2}$$

The voltage waveform is determined by the difference ($e_1-e_0$) between signals induced by switched cores ($e_1$) and signals induced by disturbed ($e_0$). Thus besides bias cancellation, the technique provides core noise cancellation. Core noise is what has been termed the disturbance voltage induced in the sense wire by a core.

FIGS. 19*a* and *b* illustrate the details of several beam wires for a delay-organized core memory matrix having 87 steps of delay (rows) and 16 receivers (columns). The figures represent the lower and upper parts of the matrix and fit together along the horizontal line denoting 45 quantized delay units. Zero delay is at the bottom of this diagram and the beams increase in elevation from the bottom row to the top. The cores 136 which one of the beam wires 148 links are shown as 45° slashes. For clarity of illustration, cores are shown for one beam wire only.

The details of a beam-organized core memory matrix are similarly shown in FIG. 20. The timing wires 139 link the core columns, the beam wires 148 link the core rows and the delay wires 137 tend to follow hyperbolic paths. As in FIG. 19, there are 87 steps of delay and 16 receivers.

Figure 19:
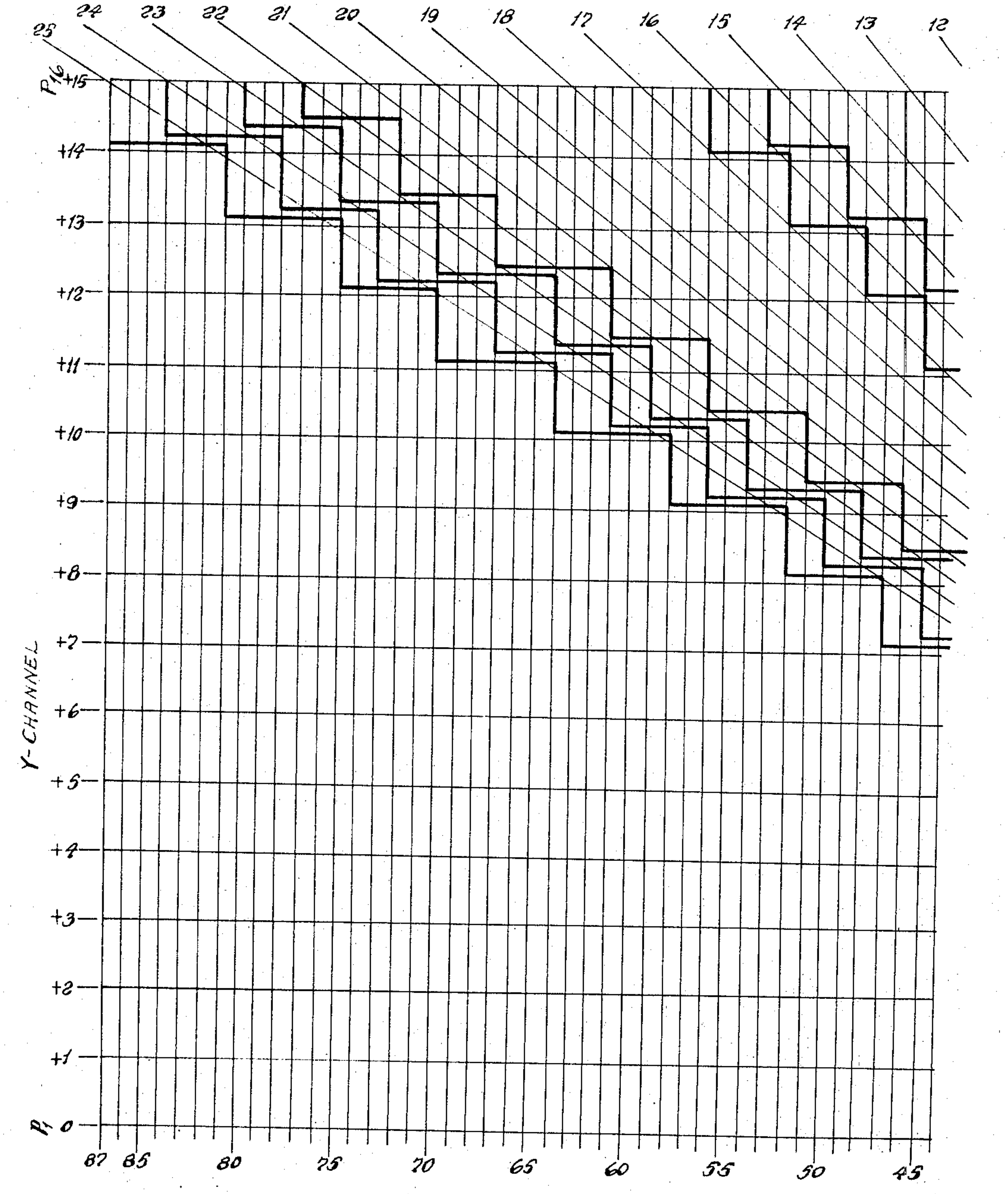

The reset wire is not shown in FIGS. 19 and 20.

Obviously many modifications and variations of the present invention are possible in the light of the above teachings. It is therefore to be understood that within the scope of the appended claims the invention may be practiced otherwise than as specifically described.

I claim:

1. A beam-organized core memory matrix for separating out, from a train of sample signals formed by successively sampling the signals from a plurality of receivers, a set of signals comprising lesser groups of successively delayed signals from each receiver and for storing each individual signal of said set in an individual spatial location in said matrix, said core memory matrix comprising, in combination:

a plurality of magnetic memory cores arranged in rows and columns to form a matrix;

a plurality of timing wires, each linking a different column of cores in said matrix, the timing signals consisting of a succession of signals synchronized in time with the succession of samples of signals derived from said plurality of receivers;

a plurality of sense wires, each linking a different row of cores in said matrix; and a plurality of delay wires, each carrying a train of core-activating signals derived from said train of sample signals, each train of core-activating signals being characterized by a different amount of delay from any other train, the amounts of delay differing from each other by fixed units, each core being linked by only one delay wire and each of said delay wires linking a set of cores of equal delay value in accordance with a predetermined formula for selecting cores whose signals are to be combined to provide a beam, the concurrence of a signal in a delay wire and a signal in a timing wire at a given core location acting to change the magnetic state of the core.

2. A beam-organized core memory matrix for separating out, from a train of sample pulses formed by successively sampling the outputs of a plurality of receivers, a set of signals comprising lesser groups of successively delayed pulses from each receiver and for storing each individual pulse of said set in an individual spatial location in said matrix, said core memory matrix comprising, in combination:

a plurality of magnetic memory cores arranged in rows and columns to form a matrix;

a plurality of timing wires, each linking a different column of cores in said matrix, the timing pulses consisting of a succession of pulses synchronized in time with the succession of samples of pulses derived from said plurality of receivers;

a plurality of sense wires, each linking a different row of cores in said matrix; and a plurality of delay wires, each carrying a train of core-activating pulses derived from said train of sample pulses, each train of core-activating signals being characterized by a different amount of delay from any other train, the amounts of delay differing from each other by fixed units, each core being linked by only one delay wire and each of said delay wires linking a set of cores of equal delay value in accordance with a predetermined formula for selecting cores whose signals are to be combined to provide a beam, the concurrence of a pulse in a delay wire and a pulse in a timing wire at a given core location acting to change the magnetic state of the core.

3. A system for electrically forming differently directed beams for an array of receiving tranducers comprising, in combination:

a plurality of receiving tranducers arranged in an array;

means for quantizing the output signals of said transducers into positive and negative components of equal amplitude;

means for successively time-sampling the quantized outputs of said transducers;

means for producing a signal train from said successive time samples;

means for adding fixed amounts of delay to said signal train in successive steps and for deriving a delayed signal train at each step;

a plurality of driving means for producing an activating signal from each positive time sample in the signal trains, successive means being connected in respective order to the output of successive delay means;

a delay-organized core memory matrix having memory cores, and delay wires, timing wires, beam sense wires and a reset wire properly threading said cores as described herein, successive driving means being connected to successive rows of said matrix;

means for applying timing signals in succession to said timing wires, the timing signals consisting of a series of signals synchronized in time with the time-sampling of the quantized outputs of said transducers, the concurrence of a timing signal and an activating signal in a core being required to switch the magnetic state of the core and such core switching acting to induce a switching signal in the beam sense wire threading the switched core;

a plurality of sense amplifier means, each connected to a different one of said beam wires, and each producing an output signal when a core-switching signal is applied to its input; and a plurality of summing means, each connected to a different one of said sense amplifier means for receiving and adding the components of the output of said sense amplifier means.

4. A system for electrically forming differently directed beams for an array of receiving transducers comprising, in combination:

a plurality of receiving transducers arranged in an array;

means for quantizing the output signals of said transducers into positive and negative components of equal amplitude;

means for successively time-sampling the quantized outputs of said transducers;

means for producing a signal train from said successive time samples;

means for adding fixed amounts of delay to said signal train in successive steps and for deriving a delayed signal train at each step;

a plurality of driving means for producing an activating signal from each positive time sample in the signal trains, successive means being connected in respective order to the output of successive delay means;

a delay-organized core memory matrix having memory cores, and delay wires, timing wires, beam sense wires and a reset wire properly threading said cores as described herein, successive driving means being connected to successive rows of said matrix;

means for applying timing signals in succession to said timing wires, the timing signals consisting of a series of signals synchronized in time with the time-sampling of the quantized outputs of said transducers, the concurrence of a timing signal and an activating signal in a core being required to switch the magnetic state of the core and any core switching acting to induce a switching signal in the beam sense wire threading the switched core;

means for applying reset signals in succession to said beam sense wires, said reset signals consisting of a series of signals corresponding to said series of timing signals but occurring between each timing-signal, or sampling, period and the succeeding sampling period, each reset signal being capable of causing any core linked by its associated beam wire to switch its magnetic state from logic one to logic zero;

sense amplifier means connected to said reset wire for producing an output signal when core-switching signals are applied to its input; and summing means connected to receive the output of said sense amplifier means as an input.

5. A system for electrically forming differently directed beams for an array of receiving transducers comprising, in combination:

a plurality of receiving transducers arranged in an array;

means for quantizing the output signals of said transducers into positive and negative components of equal amplitude;

means for successively time-sampling the quantized outputs of said transducers;

means for producing a signal train from said successive time samples;

means for adding fixed amounts of delay to said signal train in successive steps and for deriving a delayed signal train at each step;

a plurality of driving means for producing an activating signal from each positive time sample in the signal trains, successive means being connected in respective order to the output of successive delay means;

a beam-organized core memory matrix having memory cores, and delay wires, timing wires, beam sense wires and a reset wire properly threading said cores as described herein, successive driving means being connected to successive delay wires in said matrix, the timing wires linking the core columns and the beam wires linking the core rows;

means for applying timing signals in succession to said timing wires, the timing signals consisting of a series of signals synchronized in time with the time-sampling of the quantized outputs of said transducers, the concurrence of a timing signal and an activating signal in a core being required to switch the magnetic state of the core and any core switching acting to induce a switching signal in the beam sense wire threading the switched core;

a plurality of sense amplifier means, each connected to a different one of said beam wires, and each producing an output signal when a core-switching signal is applied to its input; and a plurality of summing means, each connected to a different one of said sense amplifier means for receiving and adding the components of the output of said sense amplifier means.

6. a system for electrically forming differently directed beams for an array of receiving transducers comprising, in combination:

a plurality of receiving transducers arranged in an array;

means for quantizing the output signals of said transducers into positive and negative components of equal amplitude;

means for successively time-sampling the quantized outputs of said transducers;

means for producing a signal train from said successive time samples;

means for adding fixed amounts of delay to said signal train in successive steps and for deriving a delayed signal train at each step;

a plurality of driving means for producing an activating signal from each positive time sample in the signal trains, successive means being connected in respective order to the output of successive delay means;

a beam-organized core memory matrix having memory cores, and delay wires, timing wires, beam sense wires and a reset wire properly threading said cores as described herein, successive driving means being connected to successive delay wires in said matrix, the timing wires linking the core columns and the beam wires linking the core rows;

means for applying timing signals in succession to said timing wires, the timing signals consisting of a series of signals synchronized in time with the time-sampling of the quantized outputs of said transducers, the concurrence of an activating signal and a timing signal in a core being required to switch the magnetic state of the core and any core switching acting to induce a switching signal in the beam sense wire threading the switched core;

means for applying reset signals in succession to said beam sense wires, said reset signals consisting of a series of signals corresponding to said series of timing signals but occurring between each timing-signal, or sampling, period and the succeeding sampling period, each reset signal being capable of causing any core linked by its associated beam wire to switch its magnetic state from logic one to logic zero;

sense amplifier means connected to said reset wire for producing an output signal when core-switching signals are applied to its input; and summing means connected to receive the output of said sense amplifier means as an input.

7. A system for electrically forming differently directed beams for an array of receiving transducers comprising, in combination:

a plurality of receiving transducers arranged in an array;

means for quantizing the output signals of said transducers into positive and negative polarity components of equal amplitude;

means for successively time-sampling the quantized outputs of said transducers;

means for producing a signal train from said successive time samples;

means for adding fixed amounts of delay to said signal train in successive steps and for deriving a delayed signal train at each step;

a plurality of driving means for producing an activating signal from each time sample in the signal trains of a preselected polarity, successive means being connected in respective order to the output of successive delay means;

a delay-organized core memory matrix having memory cores, and delay wires, timing wires, beam sense wires and a reset wire properly threading said cores as described herein, successive driving means being connected to successive rows of said matrix;

means for applying timing signals in succession to said timing wires, the timing signals consisting of a series of signals synchronized in time with the time-sampling of the quantized outputs of said transducers, the concurrence of a timing signal and an activating signal in a core being required to switch the magnetic state of the core and such core switching acting to induce a switching signal in the beam sense wire threading the switched core;

a plurality of sense amplifier means, each connected to a different one of said beam wires, and each producing an output signal when a core-switching signal is applied to its input; and a plurality of summing means, each connected to a different one of said sense amplifier means for receiving and adding the components of the output of said sense amplifier means.

8. a system for electrically forming differently directed beams for an array of receiving transducers comprising, in combination:

a plurality of receiving transducers arranged in an array;

means for quantizing the output signals of said transducers into positive and negative polarity components of equal amplitude;

means for successively time-sampling the quantized outputs of said transducers;

means for producing a signal train from said successive time samples;

means for adding fixed amounts of delay to said signal train in successive steps and for deriving a delayed signal train at each step;

a plurality of driving means for producing an activating signal from each time sample in the signal trains of a preselected polarity, successive means being connected in respective order to the output of successive delay means;

a delay-organized core memory matrix having memory cores, and delay wires, timing wires, beam sense wires and a reset wire properly threading said cores as described herein, successive driving means being connected to successive rows of said matrix;

means for applying timing signals in succession to said timing wires, the timing signals consisting of a series of signals synchronized in time with the time-sampling of the quantized outputs of said transducers, the concurrence of a timing signal and an activating signal in a core being required to switch the magnetic state of the core and any core switching acting to induce a switching signal in the beam sense wire threading the switched core;

means for applying reset signals in succession to said beam sense wires, said reset signals consisting of a series of signals corresponding to said series of timing signals but occurring between each timing-signal, or sampling, period and the succeeding sampling period, each reset being capable of causing any core linked by its associated beam wire to switch its magnetic state from logic one to logic zero;

sense amplifier means connected to said reset wire for producing an output signal when core-switching signals are applied to its input; and summing means connected to receive the output of said sense amplifier means as an input.

9. A system for electrically forming differently directed beams for an array of receiving transducers comprising, in combination:

a plurality of receiving transducers arranged in an array;

means for quantizing the output signals of said transducers into positive and negative polarity components of equal amplitude;

means for successively time-sampling the quantized outputs of said transducers;

means for producing a signal train from said successive time samples;

means for adding fixed amounts of delay to said signal train in successive steps and for deriving a delayed signal train at each step;

a plurality of driving means for producing an activating signal from each time sample in the signal trains of a preselected polarity, successive means being connected in respective order to the output of successive delay means;

a beam-organized core memory matrix having memory cores, and delay wires, timing wires, beam sense wires and a reset wire properly threading said cores as described herein, successive driving means being connected to successive delay wires in said matrix, the timing wires linking the core columns and the beam wires linking the core rows;

means for applying timing signals in succession to said timing wires, the timing signals consisting of a series of signals synchronized in time with the time-sampling of the quantized outputs of said transducers, the concurrence of a timing signal and an activating signal in a core being required to switch the magnetic state of the core and any core switching acting to induce a switching signal in the beam sense wire threading the switched core;

a plurality of sense amplifier means, each connected to a different one of said beam wires, and each producing an output signal when a core-switching signal is applied to its input; and a plurality of summing means, each connected to a different one of said sense amplifier means for receiving and adding the components of the output of said sense amplifier means.

10. A system for electrically forming differently directed beams for an array of receiving transducers comprising, in combination:

a plurality of receiving transducers arranged in an array;

means for quantizing the output signals of said transducers into positive and negative polarity components of equal amplitude;

means for successively time-sampling the quantized outputs of said transducers;

means for producing a signal train from said successive time samples;

means for adding fixed amounts of delay to said signal train in successive steps and for deriving a delayed signal train at each step;

a plurality of driving means for producing an activating signal from each time sample in the signal trains of a preselected polarity, successive means being connected in respective order to the output of successive delay means;

a beam-organized core memory matrix having memory cores, and delay wires, timing wires, beam sense wires and a reset wire properly threading said cores as described herein, successive driving means being connected to successive delay wires in said matrix, the timing wires linking the core columns and the beam wires linking the core rows;

means for applying timing signals in succession to said timing wires, the timing signals consisting of a series of signals synchronized in time with the time sampling of the quantized outputs of said transducers, the concurrence of an activating signal and a timing signal in a core being required to switch the magnetic state of the core and any core switching acting to induce a switching signal in the beam sense wire threading the switched core;

means for applying reset signals in succession to said beam sense wires, said reset signals consisting of a series of signals corresponding to said series of timing signals but occurring between each timing-signal, or sampling, period and the succeeding sampling period, each reset signal being capable of causing any core linked by its associated beam wire to switch its magnetic state from logic one to logic zero;

sense amplifier means connected to said reset wire for producing an output signal when core-switching signals are applied to its input; and summing means connected to receive the output of said sense amplifier means as an input.

11. A memory matrix for a multibeam system comprising a beam-organized matrix, said matrix including sets of beam wires, delay wires and memory storage elements, said storage elements being arranged in a rectangular matrix configuration, said beam wires linking with said storage elements in straight lines and said delay wires linking with said elements in patterns in which each element is linked by a delay wire only once, the path of any delay wire being determined by joining the elements of equal delay value in accordance with a predetermined formula for selecting storage elements whose signals are to be combined to form a beam.

12. A memory matrix for a multibeam system comprising a beam-organized matrix, said matrix including sets of beam wires, delay wires and memory core storage elements, said cores being arranged in a rectangular matrix configuration, said beam wires threading said core in straight lines and said delay wires threading said cores in patterns in which each core is threaded by a delay wire only once, the path of any delay wire being determined by joining the cores of equal delay value in accordance with a predetermined formula for selecting cores whose signals are to be combined to form a beam.

References Cited

UNITED STATES PATENTS

| | | | |
|---|---|---|---|
| 2,719,965 | 10/1954 | Person | 340—174 |
| 2,947,804 | 8/1960 | Eilers et al. | 178—5.1 |
| 2,989,732 | 6/1961 | Young | 340—172.5 |
| 3,061,818 | 10/1962 | Newby | 340—172.5 |

ROBERT C. BAILEY, *Primary Examiner.*

I. S. KAVRUKOV, *Assistant Examiner.*